United States Patent [19]
Wollan et al.

[11] Patent Number: 5,809,327
[45] Date of Patent: Sep. 15, 1998

[54] EIGHT-BIT MICROCONTROLLER HAVING A RISC ARCHITECTURE

[75] Inventors: Vegard Wollan, Flataasen; Alf-Egil Bogen; Gaute Myklebust, both of Trondheim, all of Norway; John D. Bryant, Los Altos, Calif.

[73] Assignee: Atmel Corporation, San Jose, Calif.

[21] Appl. No.: 824,932

[22] Filed: Mar. 27, 1997

[51] Int. Cl.$^6$ .................................................. G06F 15/00
[52] U.S. Cl. ........................................................ 395/800.33
[58] Field of Search ........................ 364/DIG. 1 MS File, 364/DIG. 2 MS File; 395/800.01, 800.23, 800.32, 800.33, 800.41

[56] References Cited

U.S. PATENT DOCUMENTS

| | | | |
|---|---|---|---|
| 5,301,340 | 4/1994 | Cook | 395/800 |
| 5,333,284 | 7/1994 | Nugent | 395/375 |
| 5,450,610 | 9/1995 | Watanabe et al. | 395/800 |

OTHER PUBLICATIONS

Hitachi H8/310 Microcontroller Architectural Overview, Sep. 1989.
Intel MCS® 51 Microcontroller Overview (no publication date).
Intel 8XC151SA/SB High–Performance CHMOS Microcontroller Product Preview, Mar. 1996.
Microchip Technology PIC16C5X Data Sheet, 1995.
Texas Instruments TMS370Cx1x 8–Bit Microcontroller Product Description, Mar. 1996.

*Primary Examiner*—Robert B. Harrell
*Attorney, Agent, or Firm*—Thomas Schneck; George B.F. Yee

[57] ABSTRACT

An eight-bit RISC based microcontroller includes an eight-bit register file having a dedicated arithmetic logic unit (ALU), in addition to a general purpose eight-bit ALU. The register file further includes means for combining a pair of registers to provide a logical sixteen-bit register for indirect addressing. The dedicated ALU is a sixteen-bit ALU which provides certain arithmetic functions for the register pair, thus alleviating the computational burdens that would otherwise be imposed on the general purpose eight-bit ALU. A further feature of the invention is the inclusion of a paging register which is combined with the contents of the logical sixteen-bit register to provide an even greater addressing range. Yet another feature of the eight-bit microcontroller of the present invention is the means for directly reading and writing to any bit position within the register file with a single instruction. This avoids having to perform various load, shift and/or masking operations needed by prior art microcontrollers.

40 Claims, 10 Drawing Sheets

EIGHT-BIT MICROCONTROLLER HAVING A RISC ARCHITECTURE

TECHNICAL FIELD

The present invention relates to microcontrollers in general, and more specifically to a microcontroller executing a reduced instruction set.

BACKGROUND ART

Present submicron CMOS technology allows for the integration of complex microcontroller architectures onto a chip, while leaving enough silicon area to implement complex memories and peripheral logic. Design architectures and methodologies most commonly used in high-end 32- and 64-bit RISC machines can be efficiently utilized and adopted in low cost 8-bit microcontroller systems. Having such powerful yet cost effective microcontrollers, the total integration level of systems continues to increase. More efficient programs can be executed in the hardware architecture, and more hardware functions can be integrated.

The RISC architecture has gained in popularity during the recent years. Most notably is the Power PC®, jointly developed by Apple Computer, IBM, and Motorola. Although there is no agreement as to the defining characteristics of RISC processors, there are common properties among the different varieties of RISC architectures: (1) most instructions execute in one cycle; (2) separate and simple load/store instructions often execute in two cycles; (3) instruction decoding is typically hardwired rather than being microcoded, resulting in faster execution times; (4) most instructions have a fixed format, thus simplifying instruction decoding; (5) smaller instruction sets and fewer addressing modes; (6) data paths are highly pipelined, providing a high degree of processing concurrency; and (7) large high-speed register sets (also known as register files) to avoid excessive data transfers to and from slower system RAM.

Several semiconductor manufacturers produce microcontrollers. Texas Instruments, for example, offers the TMS370Cx1x series of 8-bit microcontrollers. Although these microcontrollers do not employ a RISC architecture, they do provide a RAM (128 or 256 bytes) which can be used either as RAM or as a set of general purpose registers. Motorola offers the MC6805 family of 8-bit microcontrollers which employ a dual-purpose RAM similar to the Texas Instruments devices. Microchip Technology offers the PIC16C5X family of microcontrollers. These microcontrollers use the Harvard dual-bus architecture where data and program instructions have separate memories and buses. The PIC16C5X employs a register file which is shared with the system RAM. The PIC16C5X uses one level instruction pipelining; as one instruction is being executed, the next instruction is pre-fetched from program memory. Since the RAM doubles as registers, there is no real set of internal registers. Since all memory is present as a static RAM, there is a reduction in performance where register operations are involved.

As noted above, fast design cycles are an important consideration in designing with microcontrollers. There is no doubt as to the importance of the role that software plays in designing with a microcontroller. The utility of a microcontroller design, therefore, is directly related to the specification interface between programmers and hardware designers, namely the instruction set of the microcontroller. The instruction set should be complete in the sense that any computable function should be implementable in a reasonable amount of program space. The instruction set should be efficient in that frequently used functions should be implementable with relatively few instructions.

It is therefore desirable to provide a microcontroller design which provides a complete and efficient instruction set for the applications software developer.

SUMMARY OF THE INVENTION

The present invention is a microcontroller having an 8-bit RISC architecture. An 8-bit data bus provides a data path among a RAM memory store, a register file, a general purpose eight-bit arithmetic logic unit (ALU), and a status register. The microcontroller implements the Harvard architecture, providing a program memory store separate from the RAM store and a program data bus separate from the data bus.

The register file includes a plurality of eight-bit registers. Certain of the registers in the register file can be combined to provide logical 16-bit registers. A logical 16-bit register provides efficient address calculation and is used as an indirect address pointer into data memory and program memory. Whether for data or for program memory, a 16-bit address space greatly increases the flexibility and utility of the microcontroller by increasing both the program address space and the data address space. In a preferred embodiment of the invention, the register file provides three pairs of 8-bit registers which can be accessed (i.e. read/write) as three independent logical 16-bit registers.

To further enhance the benefits of 16-bit addressing, a special second arithmetic logic unit dedicated to the register file is utilized. The second ALU contains a 16-bit adder, providing 16-bit arithmetic operations for a logical 16-bit register. The second ALU can store the 16-bit result back into the logical 16-bit register. Additionally, the 16-bit result can serve as an address. Thus, the presence of the second ALU provides efficient 16-bit address calculations without burdening the general purpose eight-bit ALU which would reduce the operating speed of the device.

A further extension of the logical 16-bit register provided in the register file includes the use of an 8-bit RAM paging register. The eight bits of the RAM paging register are logically concatenated with the sixteen bits of the logical 16-bit register to provide a logical 24-bit address. This feature offers an unprecedented range of addressing for a microcontroller whose underlying architecture is fundamentally an eight-bit design. In particular, the paging register organizes memory as 256 pages of 64K (64*1024) bytes of RAM, each 64K page being referenced by the paging register. In a preferred embodiment of the invention there are three paging registers, one for each of the three logical 16-bit registers provided by the register file.

The register file of the present invention features register access with a delay equal to the propagation delay of the logic comprising the register file. Since such combinatorial delays are much shorter than a clock period, register access occurs well within one clock cycle. The invention further features a general purpose arithmetic and logic unit (ALU) capable of performing every operation within a single clock period. The invention is therefore capable of virtually all ALU operations within a single clock cycle.

Further in accordance with the invention, the registers in the register file occupy a portion of the address space of the RAM. This feature allows for conventional addressing modes, normally associated with RAM access, so that the registers may be accessed as though they were ordinary memory locations. In addition, such memory locations will appear to the microcontroller as high speed memory.

A bit store allows for the transfer of a one bit datum to and from an arbitrary bit position among the registers of the register file. In a preferred embodiment, the bit store is located in the status register. This bit transfer feature allows for the direct manipulation of register bit positions without having to perform numerous and otherwise time-consuming register shift operations. As is typical in many microcontroller applications, the individual bits comprising a one-byte datum have significance independent of the other bits. The instruction set of a prior art microcontroller typically includes shift instructions to provide left-and right-shifting of a register. Thus, access to a bit in a given bit position of a register is achieved by shifting the bit, either to the right or to the left. This is a destructive operation, requiring that the register contents be saved if the original data is to be preserved. In addition, the operation is time consuming and requires a number of program instructions to implement. The bit transfer operations of the present invention offer a more time efficient and less space consuming means for accessing arbitrary bit positions.

A compare-with-carry instruction provides 16-bit enhancement of the eight-bit registers comprising the register file. This feature of the instruction set provides an efficient method for implementing comparisons of 16-bit quantities in an eight-bit environment, thus further adding to the computational capability of the eight-bit microcontroller of the present invention.

BEST MODE OF CARRYING OUT THE INVENTION

Figure 1:
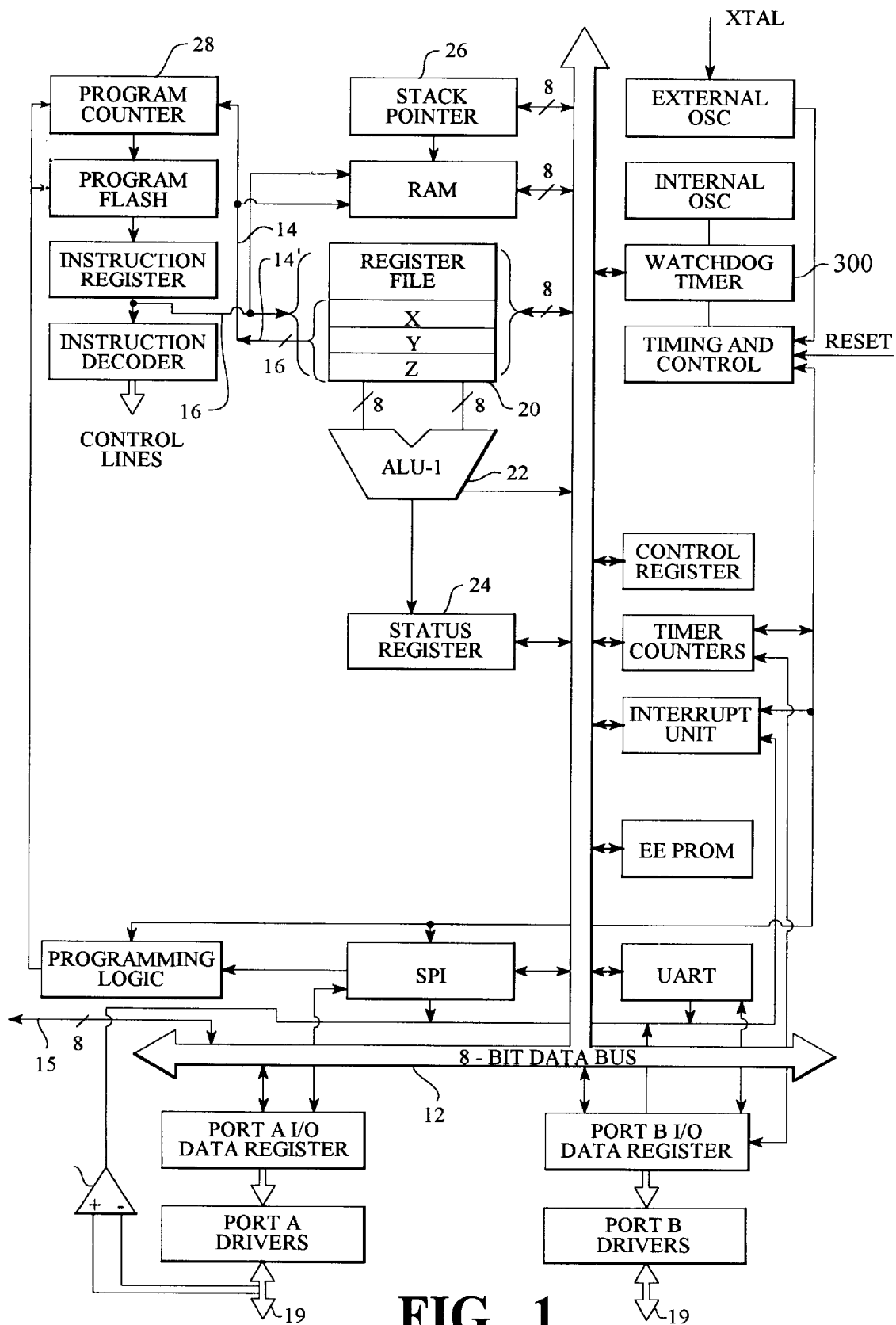
FIG. 1 shows a schematic layout of the microcontroller of the present invention.

With reference to FIG. 1, the microcontroller 10 of the present invention is designed around an eight bit data bus 12 structure. The data bus provides a data path for the various components comprising the microcontroller. An on-board RAM serves as a general data store. An eight bit REGISTER FILE 20, separate from the RAM, provides a set of high speed eight bit memory stores for the microcontroller.

A general purpose arithmetic and logic unit ALU-1 22 is coupled to the REGISTER FILE to provide arithmetic computations for data stored in the registers. The output of ALU-1 is coupled to both the eight bit data bus 12 and to a STATUS REGISTER 24. Various status bits comprising the STATUS REGISTER are set according to the results of ALU-1.

As will be explained below, the bits contained in the STATUS REGISTER 24 consist of: an interrupt enable flag; a bit transfer flag; a half-carry flag; a two's complement overflow flag; a negative flag; a sign bit, equal to the exclusive-OR between the negative flag and the two's complement flag; a zero flag; and a carry flag. The STATUS REGISTER is coupled to the data bus 12 to allow read/write access to the status bits. Additional components coupled to the data bus 12 include: a STACK POINTER used for subroutine calls/returns and for interrupt handling; a timer; an interrupt circuit; timing and control circuitry; an EEPROM; and a UART. I/O DATA REGISTERS driven by PORT DRIVERS provide an I/O path 19 for the microcontroller.

A direct-address bus 16 provides direct access to the RAM locations and to the REGISTER FILE during program execution. An indirect-address bus 14 provides indirect addressing. The indirect-address bus 14 includes a means for receiving an address from the REGISTER FILE, namely the bus interface 14' which couples the REGISTER FILE to the indirect-address bus 14 for transmitting an address either to the RAM or to a PROGRAM COUNTER 28.

The instruction execution components of the microcontroller 10 include a PROGRAM COUNTER 28 which is coupled to a PROGRAM MEMORY. In a preferred embodiment, the PROGRAM MEMORY is a programmable flash memory. A program instruction specified by the PROGRAM COUNTER is fetched from the PROGRAM MEMORY and fed into an INSTRUCTION REGISTER. From the INSTRUCTION REGISTER, the program instruction is decoded by an INSTRUCTION DECODER which generates various control signals. The control signals are carried by CONTROL LINES to the other components of the microcontroller 10 to perform operations in accordance with decoded program instructions. The buses coupling the instruction execution components are collectively referred to as the program bus. The arrangement of a program memory store that is separate from the data store and the use of a program bus that is separate from the data bus 12 is commonly referred to as the Harvard architecture.

As noted above, the REGISTER FILE consists of a plurality of eight bit registers. In a preferred embodiment of the invention, there are thirty-two eight bit registers. It is pointed out, however, that the microcontroller will operate equally well with more or fewer registers in the REGISTER FILE. The general purpose arithmetic and logic unit ALU-1 is an eight bit operator, providing eight bit arithmetic operations between registers selected from the REGISTER FILE. The output of ALU-1 can be fed back to a register in the REGISTER FILE via the data bus 12. As will be discussed in greater detail below, some of the eight bit registers can be combined in pairs to provide logical sixteen bit registers. In the preferred embodiment, three pairs of eight bit registers provide three logical sixteen bit registers X,Y,Z, as shown in FIG. 1.

Figure 2:
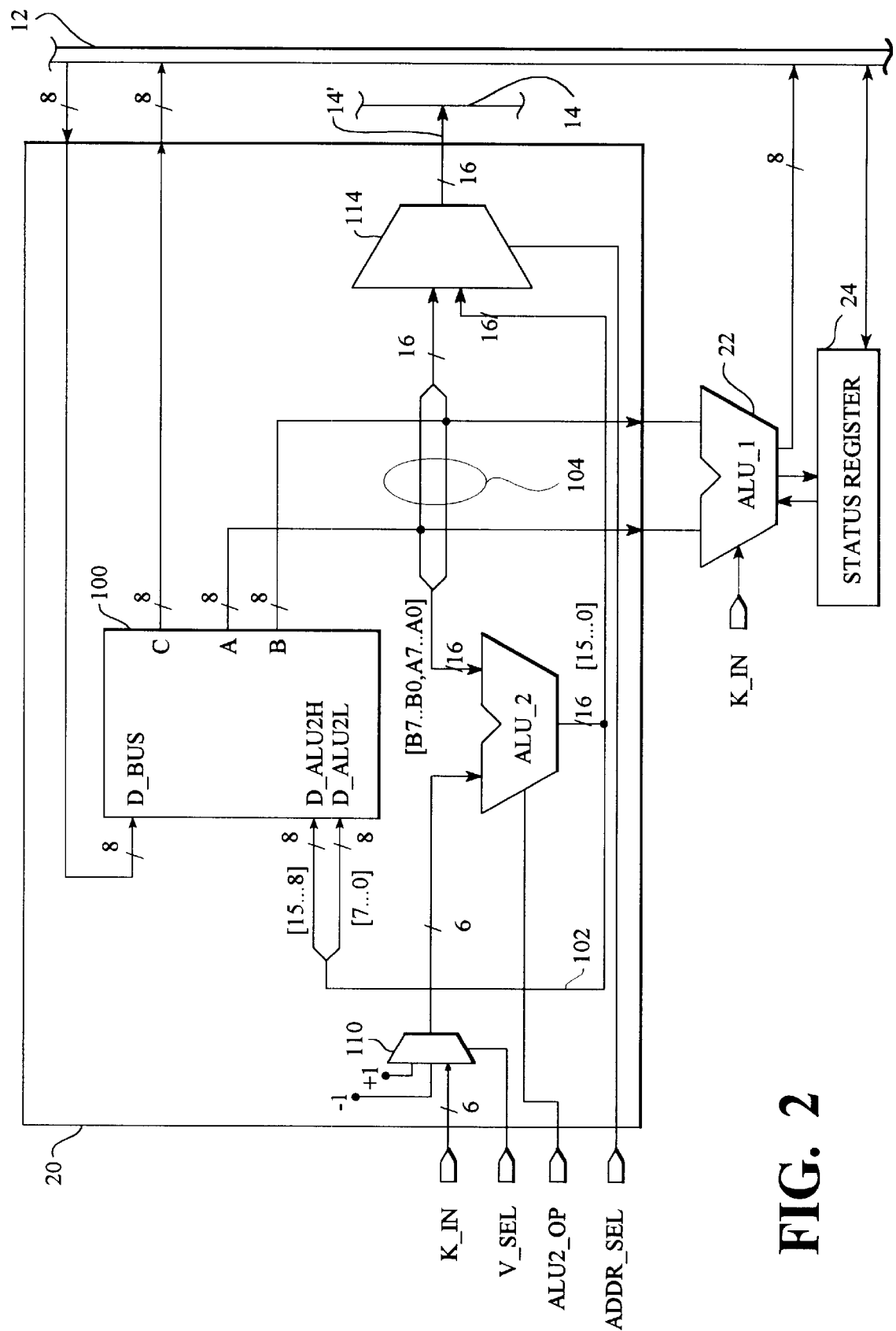
FIG. 2 depicts an internal representation of the register file identified in FIG. 1.

Turning to FIG. 2, the REGISTER FILE of the present invention includes register circuitry 100 which provides thirty-two eight bit registers R0–R31. The REGISTER FILE includes three outputs A, B, C and three inputs D_BUS, D_ALU2H, D_ALU2L. As will be described below, the register circuitry 100 is capable of provisioning the last six registers R26–R31 as three pairs of logical sixteen bit registers R27/R26 (X), R29/R28 (Y), R31/R30 (Z). A common bus interface consisting of two sixteen-line data buses 102, 104 provide respectively a data-in and a data-out bus for the sixteen bit registers.

The data-out bus 104 is built up from the B and A outputs, the B output providing the high-byte and the A output providing the low-byte of the sixteen bit value. The data-in bus 102 splits into D_ALU2L (low-byte) and D_ALU2H (high-byte) inputs to the REGISTER FILE.

The sixteen bit registers provided by the REGISTER FILE are used as indirect address register pointers for RAM and program-space addressing. To facilitate memory access, certain sixteen bit arithmetic operations, such as post-increment and pre-decrement, are provided for address calculations. Although it is possible to use ALU-1 to provide sixteen bit arithmetic for the sixteen bit registers, such operations would be quite inefficient because of the eight bit design of ALU-1.

The REGISTER FILE shown in FIG. 2 therefore includes a second arithmetic and logic unit ALU-2 dedicated to the REGISTER FILE to facilitate sixteen bit computations involving the logical sixteen bit registers. The arithmetic and logic unit ALU-2 is a sixteen bit design, customized to provide specific operations typically required of indirect address pointers. The ALU-2 has a first input which is fed by the data-out bus 104 of the REGISTER FILE. The ALU-2 has a second input which is fed by a selector 110. The selector 110 selects a numeric value from among three choices: a numeric value of −1, a numeric value of +1, and a constant K_IN. The output of ALU-2 feeds back to the X,Y,Z registers on the data-in bus 102, allowing for the contents of the registers to be updated. A mux 114 is coupled to the bus interface 14' of the REGISTER FILE. One input of the mux 114 is coupled to the output of the ALU-2, while a second input of the mux is coupled to the data-out bus 104. This arrangement allows the mux 114 to selectively output data either from ALU-2 or from the register circuitry 100.

The following control signals are pertinent to the operation of the discussed features of the REGISTER FILE. They include: V_SEL, ALU2_OP, and ADDR_SEL. These signals are carried by various CONTROL LINES originating from the INSTRUCTION DECODER. Operation of the REGISTER FILE in terms of these control signals will be discussed below with reference to the program instructions of the microcontroller of the present invention.

Figure 3:
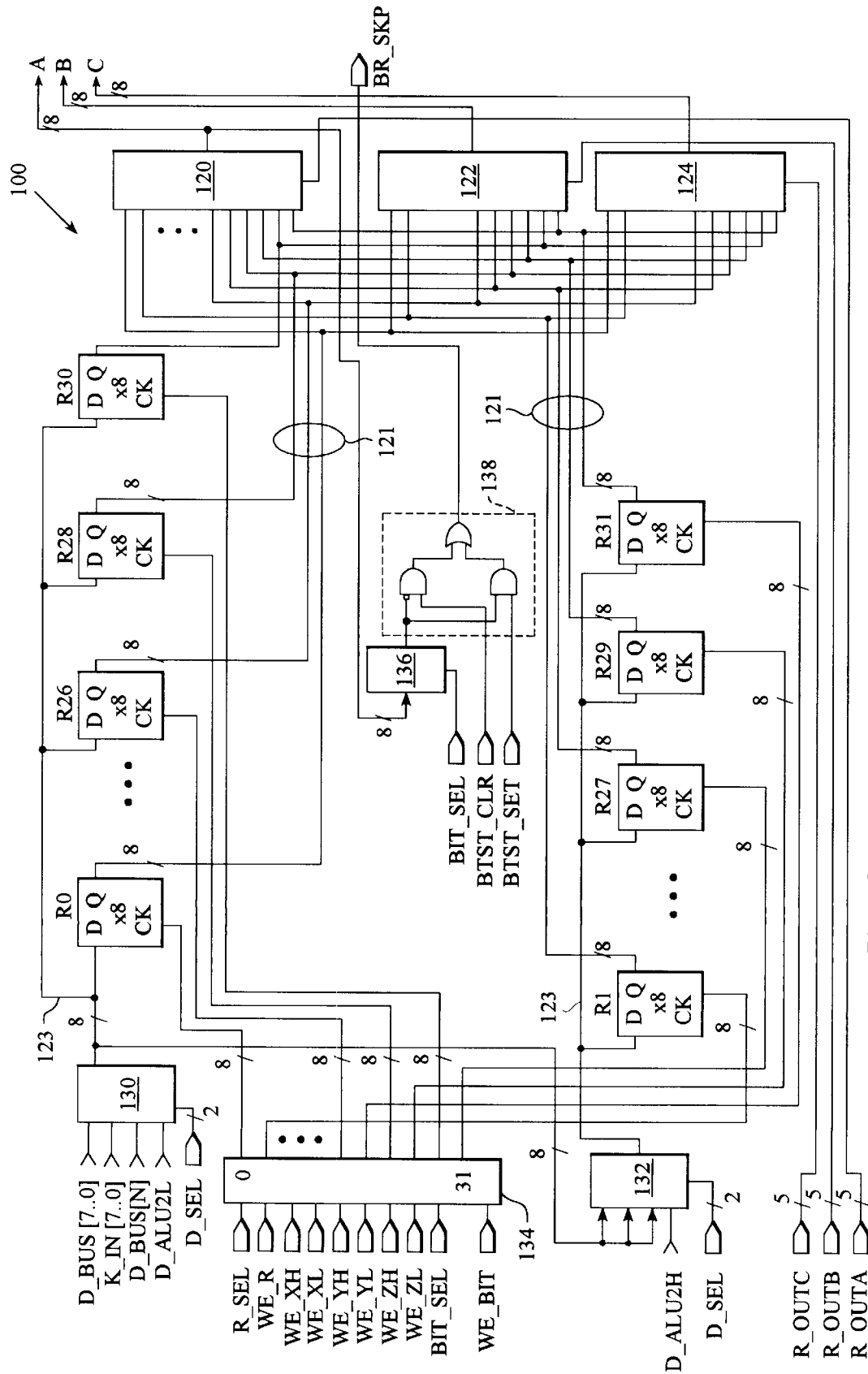
FIG. 3 illustrates the construction of the registers in the register file shown in FIG. 2.

The internal organization of the register circuitry 100 illustrated in FIG. 2 is shown in the logic diagram of FIG. 3. In one embodiment of the invention, thirty-two registers R0–R31 are provided, each having a set of eight bit output lines 121 and a set of eight bit input lines 123. The actual number of registers provided is not critical to the invention.

Each register consists of a bank of eight D-type flip-flops, indicated by the "x8" reference within each flip-flop in FIG. 3. The output lines 121 of a register consist of the output Q of each of the eight flip-flops comprising the register. Similarly, the input lines 123 of a register consist of the input D of each of the eight flip-flops comprising the register.

As shown in FIG. 3, the even numbered registers R0, R2, . . . R30 have a common input coupled to the output of an eight bit 4:1 mux 130. In like manner, the odd numbered registers R1, R3, . . . R31 have a common input separate from the even numbered registers and coupled to the output of an eight bit 4:1 mux 132. The 4:1 mux 130 selects one of its 4 eight bit inputs D_BUS, K_IN, D_BUS[n], and D_ALU2L to serve as input to the even numbered registers.

The 4:1 mux 132 selects one of its 4 eight bit inputs to serve as input to the odd numbered registers. A selector D_SEL is coupled to both mux's and selects either the first, second, third, or fourth input of each of the mux's 130, 132. The first input D_BUS of mux 130 is taken from the eight bit data bus. The second input K_IN of mux 130 is an eight bit constant which is derived from the operand of certain instructions, as will be explained below in connection with the discussion of the instruction set of the present invention microcontroller. The fourth input D_ALU2L of mux 130 is the low-byte of the sixteen bit output of ALU-2 (FIG. 2). The D_BUS[n] input to mux 130 refers to one of the bit lines from the data bus 12. This bit line n is replicated eight times as the third 8-bit input to the mux 130. The D_BUS[n] input is used with the BLD instruction explained below.

The output of mux 130 is replicated as the first, second, and third inputs of the mux 132. The fourth input D_ALU2H of mux 132 is the high-byte of the sixteen bit output of ALU-2. Thus when D_SEL selects the first, second, or third mux inputs, the even and odd numbered registers are presented with the same input, namely D_BUS, K_IN, or D_BUS[n]. When D_SEL selects the fourth mux input, the inputs of the even numbered registers are presented with D_ALU2L and the inputs of the odd numbered registers are presented with the D_ALU2H input. The significance of the D_ALU2L and D_ALU2H inputs will become clear in the discussion relating to the X, Y, and Z registers.

The bank of eight flip-flops corresponding to each register R0–R31 is written to by presenting input to the D leads and by asserting the clock lines CK of the flip-flops. An advantage of the register architecture of the present invention is the flexibility in writing to the registers. Depending on the mode of operation, a sixteen bit datum may be written into a register pair as a one-word datum, an eight bit datum may be written into a register as a one-byte datum, or a specific bit of a register may be written as a one-bit datum. This flexibility is provided by the selector control circuitry 134 which asserts the proper CK signals so that the correct register and bit(s) are written. The R_SEL and WE_R control lines cooperate to write the eight flip-flops corresponding to a selected register. The WE_XH, WE_XL, WE_YH, WE_YL, WE_ZH, and WE_ZL control lines enable a write to the sixteen bit X, Y, and Z registers. The R_SEL, BIT_SEL, and WE_BIT control lines cooperate to write a bit into a selected bit of a selected register.

The register contents are provided through the mux's 120, 122, 124, the outputs of which are respectively the A, B, and C outputs shown in FIG. 2. Each of these output mux's is an eight bit 32:1 mux, which selects one of 32 eight bit inputs. The outputs of each of the 32 registers are coupled to the corresponding inputs of each of the mux's 120, 122, 124. The control lines R_OUTA, R_OUTB, R_OUTC operate the mux's to output the contents of the desired registers.

The eight-bit output of mux 120 feeds into an 8:1 mux 136, where the BIT_SEL control line serves to select one of the eight bits. The mux 136 output is coupled to a bit test circuit 138, which is operated by the BTST_CLR and BTST_SET control lines to test whether the selected bit is cleared or set. The output of the bit test circuit drives the BR_SKP control line.

In accordance with the present invention, the microcontroller provides logical sixteen-bit registers in addition to the eight-bit registers described. This is accomplished by taking pairs of registers in the register file and treating them as a single register. Three sixteen-bit registers, X, Y, Z are provided in this manner. The X-register consists of the register pair R27/R26; the Y-register consists of the register pair R29/R28; and the Z-register consists of the R/31/R30 register pair.

Figure 4:
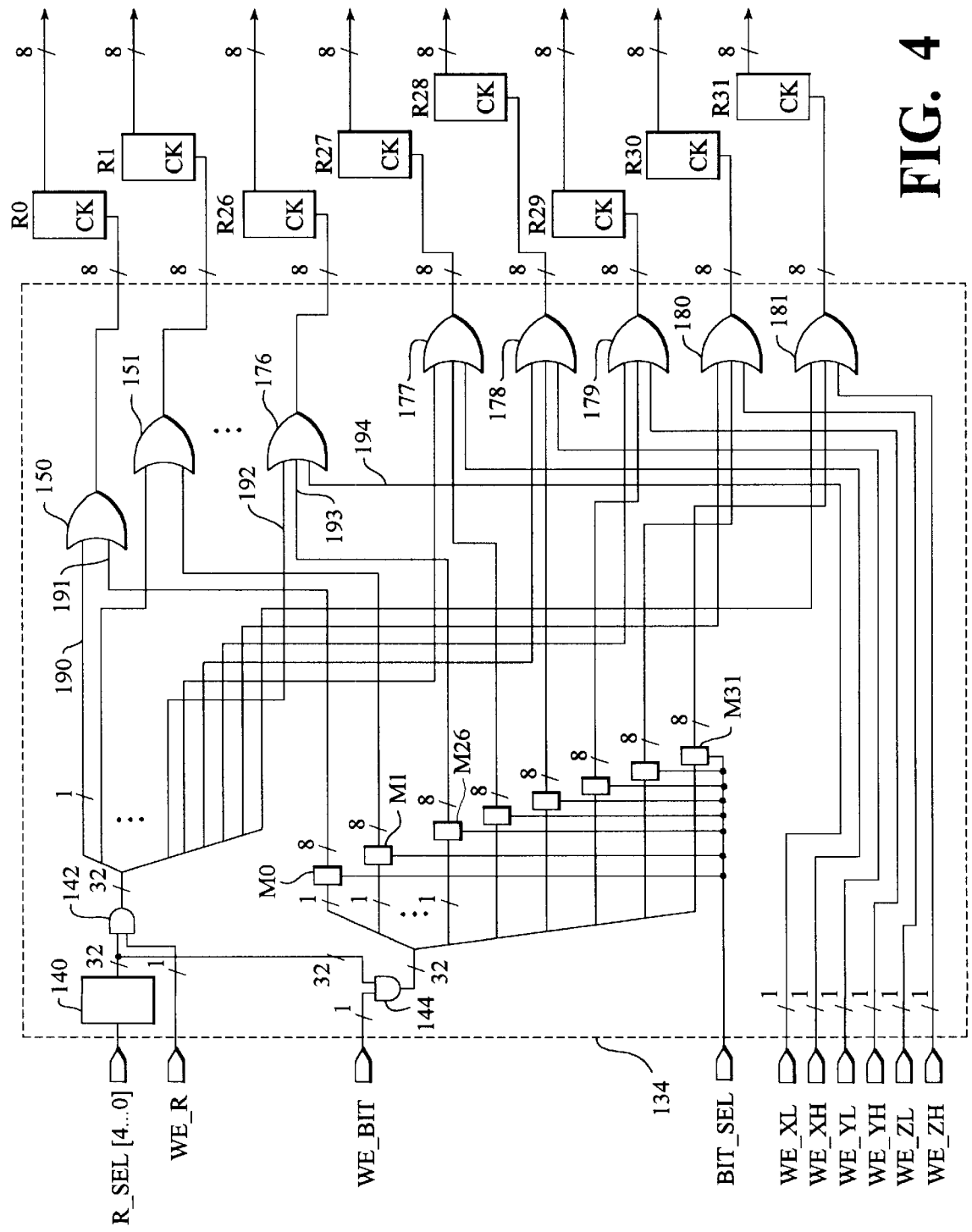
FIG. 4 details the register write enable circuitry shown in FIG. 3.
Figure 13:
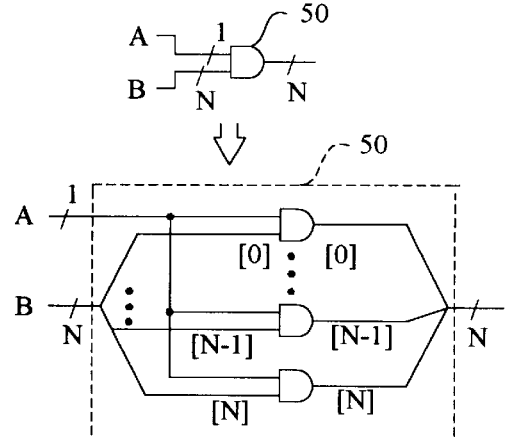
FIG. 13 shows an N-input enabling AND gate.

Turn now to FIG. 4 which shows the selector control circuitry 134 of FIG. 3 in greater detail. The decoder unit 140 is a 1:32 decoder which asserts any one of the 32 output in response to decoding R_SEL. Each output line of the decoder corresponds to a register. The outputs feed into two enabling AND gates 142, 144. FIG. 13 details the construction of an enabling AND gate 50, having a one-bit enabling input A, an N-bit input B, and an N-bit output. The expanded detail in FIG. 13 shows that such a gate consists of N two-input AND gates. The first input of each of the N AND gates receives the enabling input A, while the second input of the AND gates receives one of the N bits of the B input. Thus, the gate 50 allows the B input to pass to the output, provided that the enabling input A is asserted. Otherwise, all N outputs of the enabling AND gate 50 are LOW. Returning to FIG. 4, the enabling gate 142 is enabled by WE_R, while the enabling gate 144 is enabled by WE_BIT.

Figure 5B:
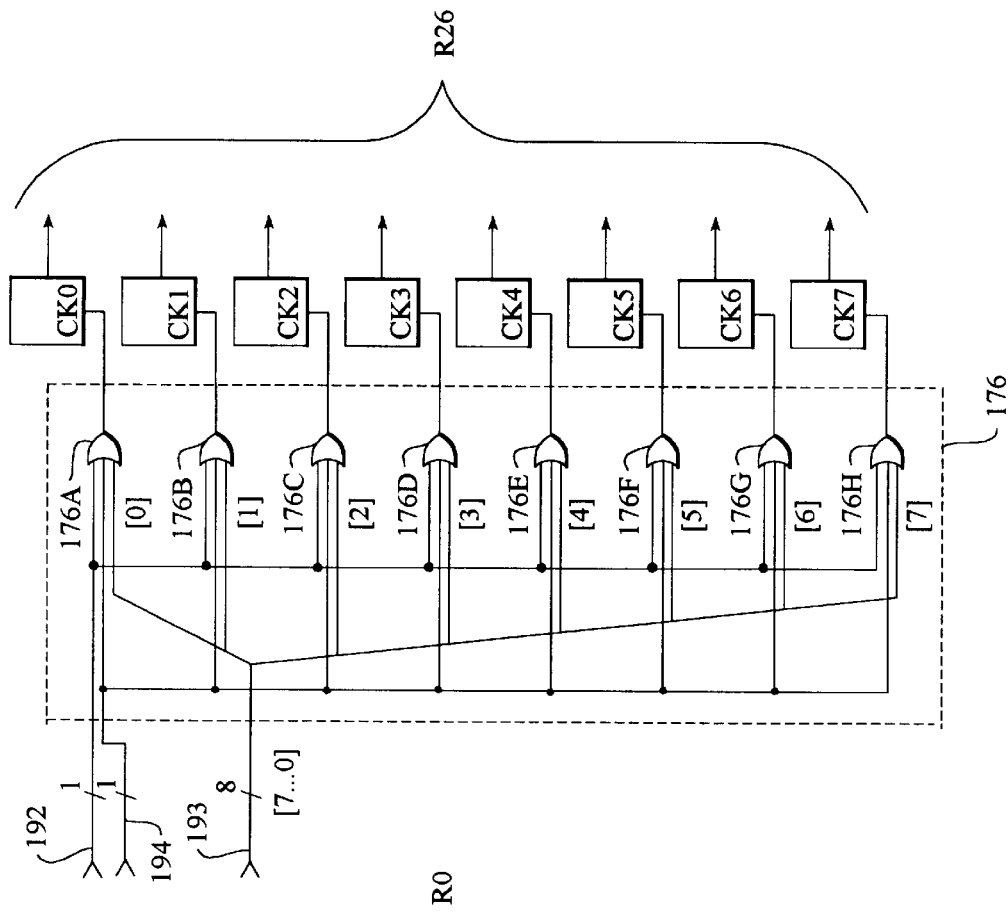
FIGS. 5A and 5B show the OR gate constructions used in FIG. 4.
Figure 5A:
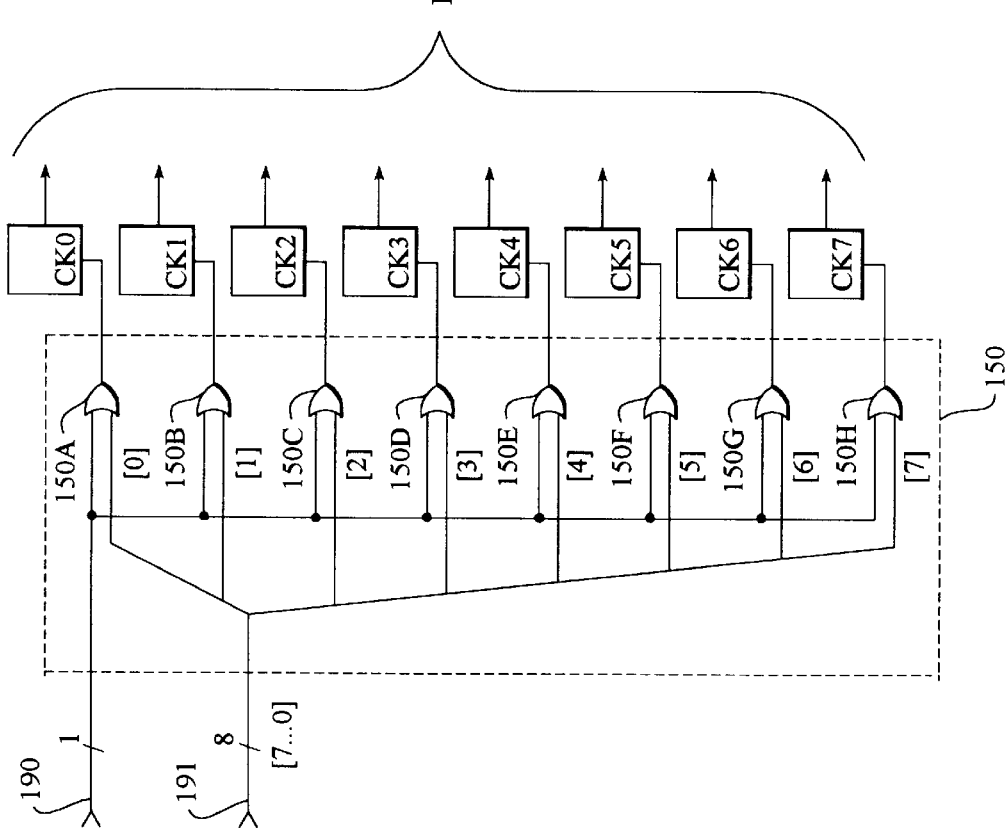

Continuing, each of the 32 outputs of the enabling gate 142 is coupled to an input of a composite OR gate 150–181. Each of the 32 outputs of the enabling gate 144 is coupled to a 1:8 mux M0–M31. The eight outputs of each mux M0–M31 are coupled to another input of the composite OR gates 150–181. Each composite OR gate is associated with a register R0–R31. FIG. 5A shows the construction of composite OR gate 150. The composite OR gate 150 consists of eight separate two-input OR gates 150A–150H. The one-bit input line 190 originates from an output of the enabling gate 142, and is coupled to the first input of each of the OR gates 150A–150H. The eight-bit input line 191 originates from the outputs of mux M0. Each of the input lines 191 is coupled to the second input of an OR gate. As can be seen each of the OR gates is coupled to the CK line (CK0–CK7) of one of the flip-flops of register R0. This construction applies to composite OR gates 150–175.

Returning to FIG. 4, note that some of the composite OR gates, namely gates 176–181, have a third input. This third input comes from one of the WE_XL, WE_XH, WE_YL, WE_YH, WE_ZL, and WE_ZH control lines, relating to the writing of the X, Y, Z registers. As can be seen in FIG. 5B, showing the detail of composite OR gate 176, the additional one-bit control line 194 is coupled to a third input of each of the OR gates 176A–176H. This construction applies to composite OR gates 176–181.

As mentioned above, the R_SEL and WE_R control lines cooperate to write eight-bit data into a selected register. This is accomplished by clocking the data into the flip-flops corresponding to the register. Consider, for example, the writing of data into register R0. The five bit control line R_SEL is set to select register R0. The decoder 140 decodes the line, thereby asserting the output line corresponding to register R0, which is coupled through the enabling gate 142 to the input lines 190 of OR gate 150. As shown in FIG. 5A, the input line 190 simultaneously clocks all of the flip-flops of register R0, thereby inputting the data appearing at the D input of the flip-flops (FIG. 3).

Figure 6:
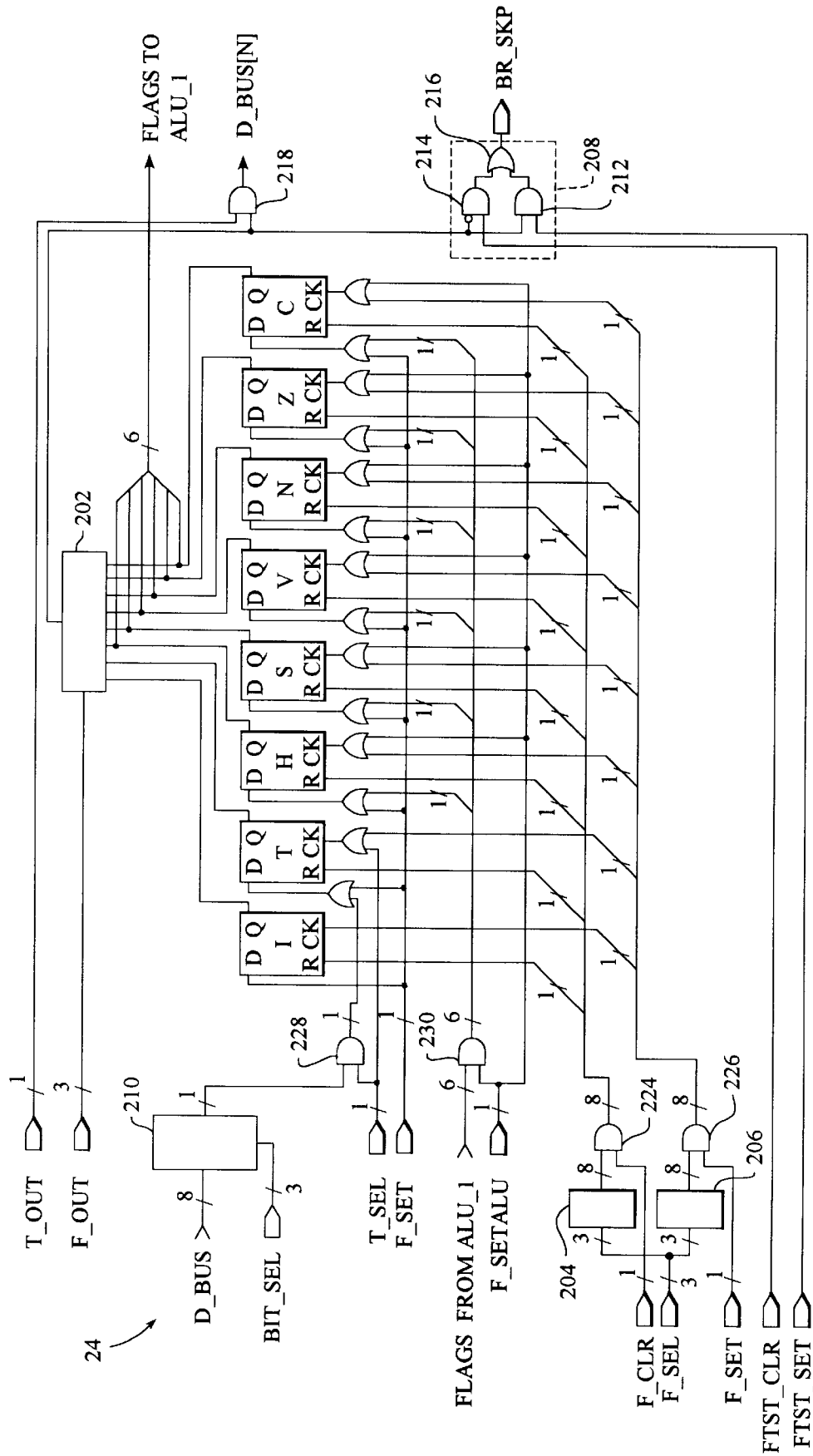
FIG. 6 depicts the internal structure of the status register shown in FIG. 1.

Before discussing the R_SEL, WE_BIT, and BIT_SEL control lines, turn to FIG. 6 for an illustration of the status register 24. It consists of eight flip-flops, one for each of the status bits used in the present invention: an interrupt enable flag I; a bit transfer flag T; a half-carry flag H; a two's complement overflow flag V; a negative flag N; a sign bit S, equal to the exclusive-OR between the negative flag and the two's complement flag; a zero flag Z; and a carry flag C. The input to the I flip-flop is tied directly to the F_SET control line. The input to the T flip-flop is coupled via the OR gate to the F_SET control line and to the output of AND gate 228. The inputs to the remaining flip-flops are coupled via their respective OR gates to the F_SET control line and to the eight outputs of enabling AND gate 230 (FIG. 13).

An 8:1 mux 202 receives the outputs of all of the status register flags and outputs a selected one of the flags in accordance with the setting of the F_OUT control line. The output of mux 202 feeds into a bit-test means 208 to produce a BR_SKP control signal. The mux 202 output also feeds into AND gate 218, the output of which is tied to the bit N of the data bus D_BUS[n]. Additionally, the H, S, V, N, Z, and C flags feed into the general purpose ALU 22, discussed below.

Each flip-flop includes a reset R which effectively allows a specific flag to be cleared simply by resetting its corresponding flip-flop. Each reset is tied one of the eight outputs of the enabling AND gate 224. The enabling AND gate 224 is enabled by the T_SEL control line.

The clock input of the I flip-flop is tied to an output of the enabling AND gate 226. The clock input of the T flip-flop is tied via an OR gate to the enabling gate 226 and to the T_SEL control line. The remaining flip-flops are tied via their respective OR gates to the enabling gate 226 and to the F_SETALU control line.

A mux 210 receives input D_BUS from the 8-bit bus. The BIT_SEL control line outputs one of the eight bits to the AND gate 228, the output of which feeds into the T flip-flop. The T_SEL control line serves as an enabling input to the AND gate 228.

The enabling AND gate 230 receives input from the general purpose ALU 22, and is enabled by the F_SETALU control line. This element serves to update the status flags received from the ALU during an ALU operation. This will be discussed further in connection with the discussion of the ALU 22.

The decoders 204, 206 each decodes the F_SEL control line to assert one of its eight outputs, which feed into enabling AND gates 224, 226 respectively. The F_CLR control line enables gate 224. The F_SET control line enables gate 226.

The bit test means 208 consists of a pair AND gates 212, 214 feeding into an OR gate 216. The gate 214 has an inverted input which is coupled to the mux 202. The other input to gate 214 is coupled to the FTST_CLR control line. The inputs to gate 212 are the mux 202 output and the FTST_SET control line.

The mux 202 output is also tied to AND gate 218 which is enabled by the T_OUT control line. The output of AND gate 218 is shown coupled to bitline n of the eight-bit data bus.

The discussion will now turn to another feature of the eight bit microcontroller of the present invention. Recall from the discussion above, that prior art techniques for loading or storing an arbitrary bit position of a register requires register shift and/or register masking operations, resulting in less efficient code and increased code size. In addition, this is a destructive operation, requiring that the register contents be saved if the original data is to be preserved.

Consider the R_SEL, WE_BIT, and BIT_SEL control lines shown in FIGS. 3–6. These control lines operate the register circuitry 100 (FIG. 3) to effectuate writing a single bit to a specific bit location of a selected register. The bit to be written is obtained from the status register 24 and provided via D_BUS[n]. This is accomplished by setting F_OUT (FIG. 6) to select the output of the T flip-flop at mux 202, and asserting T_OUT to enable the AND gate 218 to drive the output onto the data bus. Continuing, the bit becomes available at each of the eight output lines of the mux 130 and of the mux 132, by virtue of D_SEL selecting the D_BUS[n] input of mux 130. This presents the bit to be written to the input of all of the flip-flops of all of the registers (FIG. 4). Consider, for example, that the bit is to be written to bit position two of register R26. The R_SEL control line, which is set to select register R26, is decoded by decoder 140 (FIG. 4) to assert the corresponding output line. The WE_BIT control line is asserted to enable the decoded output to pass to the input of the 1:8 mux corresponding to register R26, namely mux M26. The BIT_SEL control line, which is set to select bit position two, operates each mux, including mux M26, to gate its one-bit input to the second of its eight outputs. Continuing from mux M26, its eight output lines serves as input 193 of composite OR gate 176 shown in FIG. 5B. Each line [0–7] of the input 193 passes through an OR gate 176A–176H to a specific flip-flop. However, since only one of the lines is asserted, in this case line [1], only one of the flip-flops of the selected register is clocked to receive the bit.

Figure 7:
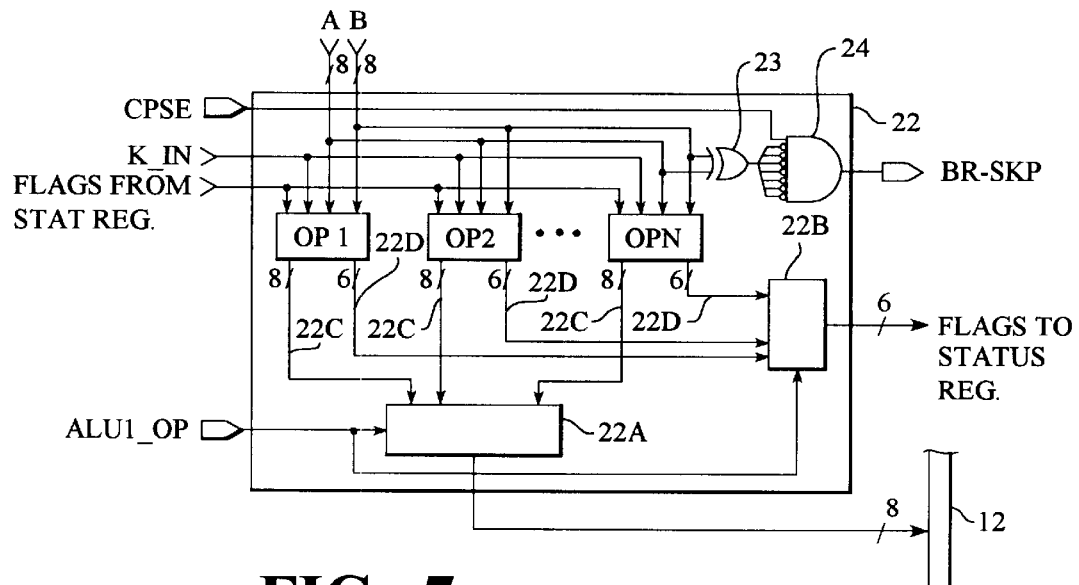
FIG. 7 depicts the internal structure of the general purpose ALU shown in FIG. 1.

The discussion now turns to the general purpose ALU 22 of the present invention, shown in FIG. 7. The ALU 22 consists of a plurality of operation subunits OP1-OPn, each capable of performing a particular operation. Typical operations performed by the general purpose ALU include addition, logical operations, and shift operations, each being performed by a separate subunit. The inputs to the ALU, namely A, B, K_IN, and the flags from the status register 24, are fed into each of the subunits. The subunits simultaneously perform their corresponding operation and generate eight-bit results 22C and six-bit status results 22D. This parallel architecture provides faster execution times over serial implementations, enabling any ALU operation to occur within a single clock cycle.

Continuing, the results 22C of the subunits feed into selector 22A. The selector is controlled by ALU1_OP to output the results of one of the operation subunits onto the data bus 12. The status results 22D are handled in a similar manner, each being fed into selector 22B which is also controlled by ALU1_OP so that the status register 24 receives the status results corresponding to the selected operation.

The ALU 22 also includes an XOR gate 23 and a nine-input AND gate 24. The XOR performs a bitwise XOR operation between each of the eight bits of the A and the B inputs. The eight results of the XOR operation are fed into the eight inverted inputs of the AND gate. When A=B, all eight results of the XOR operation will be logic "0." This will cause the AND gate to output logic "1" when the CPSE control line is asserted, thus asserting the BR_SKP control line.

Figure 8B:
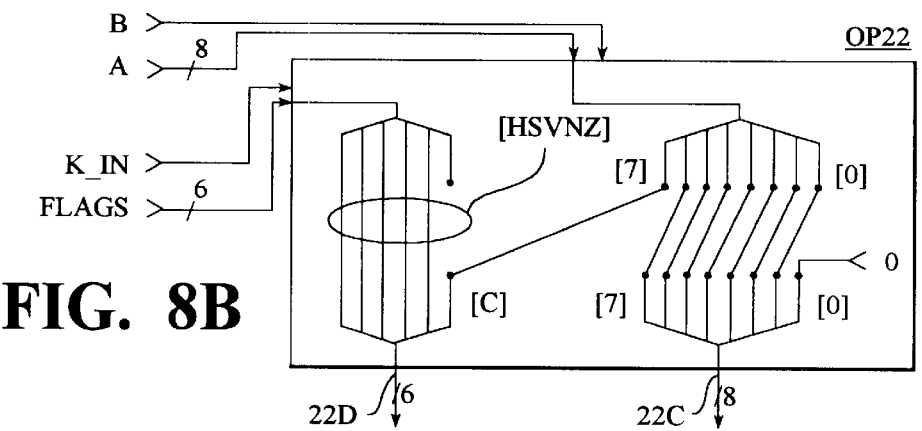
FIGS. 8A and 8B show two ALU subunits contained in the general purpose ALU of FIG. 7.
Figure 8A:
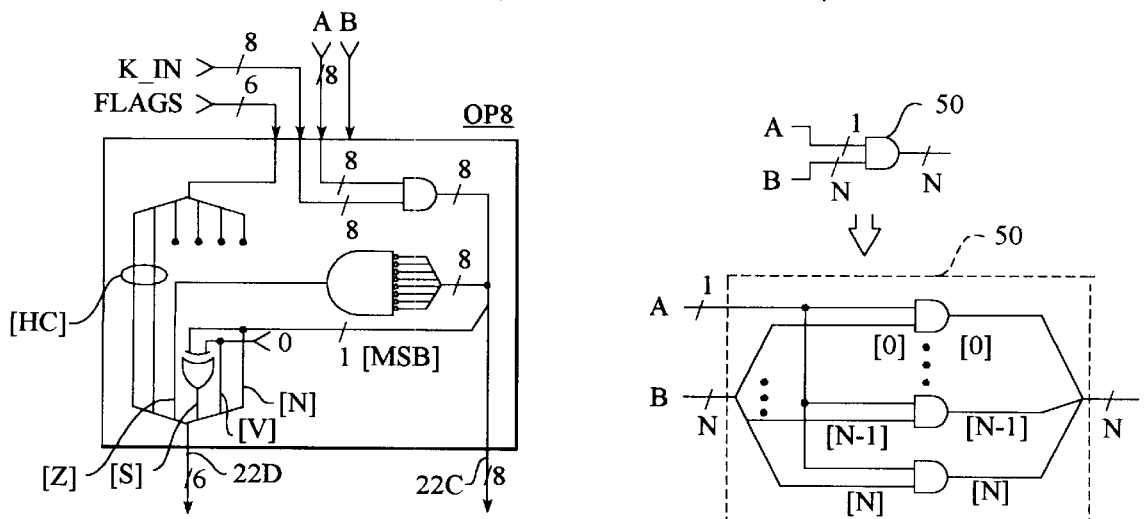

As noted above, each of the subunits OPn provides a specific arithmetic or logic operation, operating on the A, B and/or K_IN inputs to provide a result 22C and updating the appropriate status flags. FIGS. 8A and 8B show two typical operation subunits: FIG. 8A implements a logical AND between the A input and an immediate constant provided via K_IN; FIG. 8B implements a logical shift left of the A input.

Figure 9:
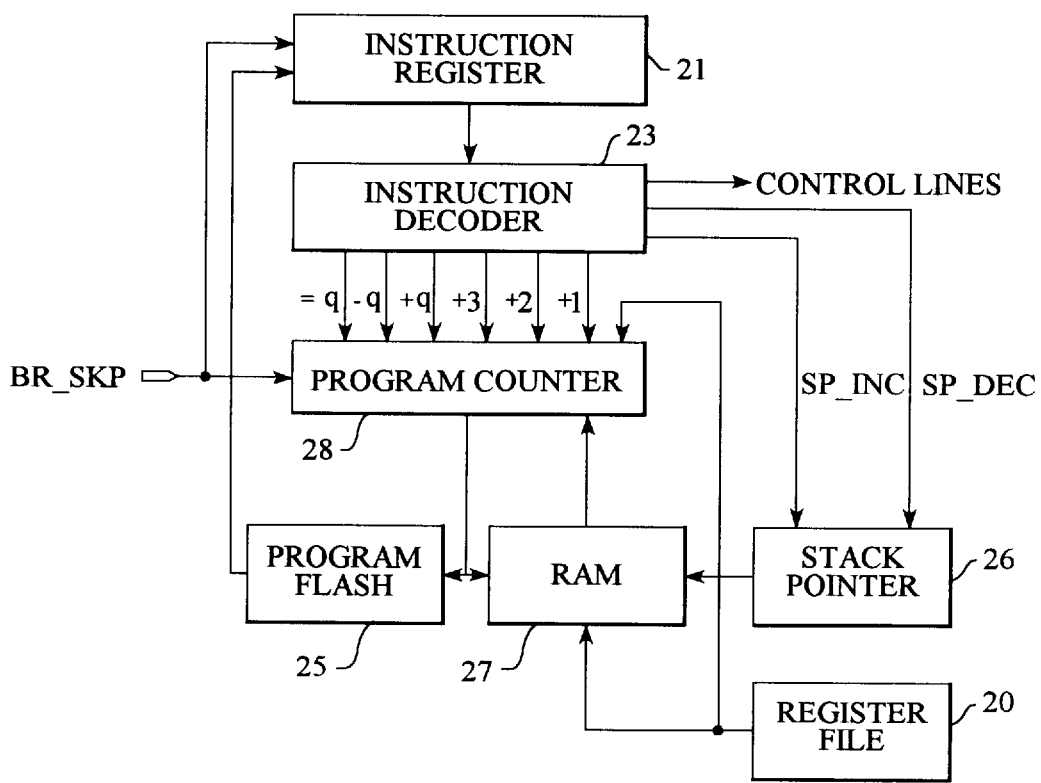
FIG. 9 shows the program counter.

Turn now to FIG. 9 for a discussion of program sequencing. Instructions are fetched from the program memory 25 and loaded into the instruction register 21. The instruction decode 23 contains logic for decoding the fetched instruction and for producing control signals which are carried by the control lines to other parts of the microcontroller to execute the instruction. The instruction decoder asserts SP_INC and SP_DEC to increment or decrement the stack pointer in response to subroutine instructions and interrupts.

At the same time, the instruction decoder 23 also produces signals for "incrementing" the program counter 28 to fetch the next instruction. These signals include: =q, -q, +q, +3, +2, and +1. The "=q" signal is used for those instructions which specify a branch to an absolute address q. The "+q" and "-q" signals are used for those instructions which specify forward and backward relative branches by an amount q. In each of these cases, the quantity q is contained in the instruction. The "+3" and "+2" signals are used for skip instructions, the number of memory locations to be skipped being dependent upon the size of the instruction being skipped. The "+1" signal simply increments the program counter to the next instruction. In addition, the program counter receives input from the register file 20 for those instructions which utilize one of the X, Y, or Z registers as the source of the address of the next instruction. The program counter also receives input from the RAM 27 as another source of the address of the next instruction, the location in the RAM being specified by one of the X, Y, and Z registers or the stack pointer 26.

Typically, the instruction decoder issues the "+1" signal, causing the program counter 28 and program flash to pre-fetch the very next instruction, while the current instruction is executing. However, when the BR_SKP control line is asserted, the program counter 28 and the instruction register 21 are made to discard the pre-fetched instruction, compute the new address, and fetch the new instruction; the new address being dependent upon the instruction. Further detail will be provided in connection with the discussion of the specific branch instructions.

Figure 10:
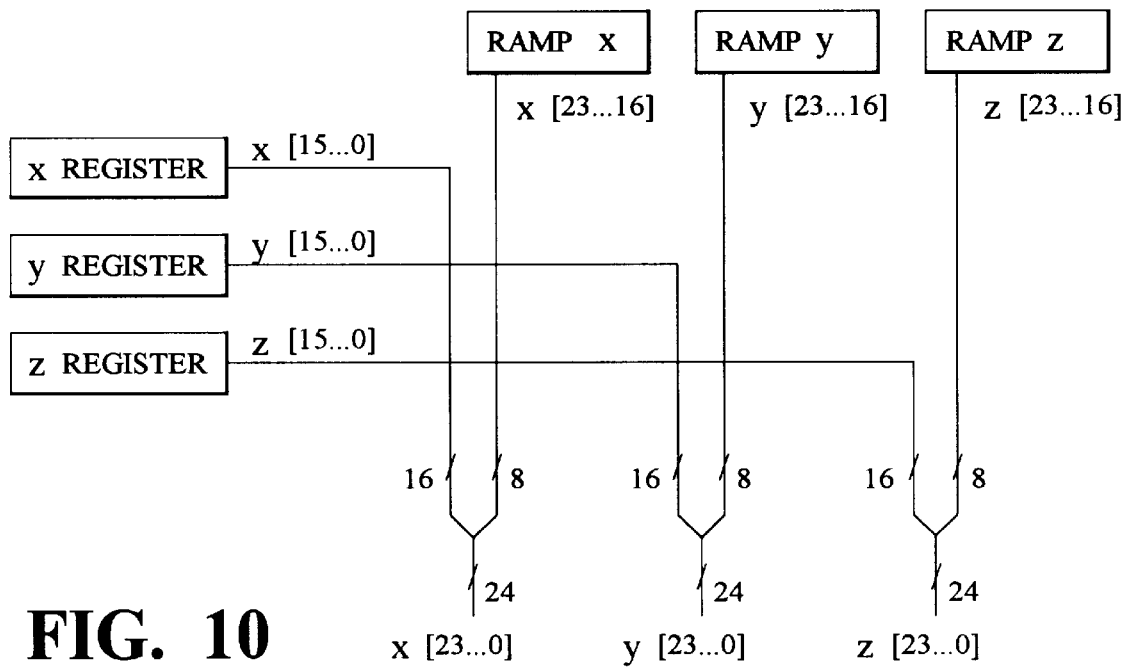
FIG. 10 illustrates the formation of a 24-bit logical address using paging registers in accordance with the present invention.

Another feature of the eight bit microcontroller of the present invention is an enhanced addressing capability as shown in FIG. 10. Shown are three additional registers external to the REGISTER FILE, namely the RAM paging registers RAMPX,RAMPY,RAMPZ. The RAM paging registers operate in conjunction with their corresponding logical sixteen bit registers X,Y,Z to provide a greatly increased addressing range as compared to prior art eight bit microcontrollers. In the disclosed embodiment, the RAM paging registers are eight bit registers. However, this is not critical, and it will become clear that the invention can easily work with registers having a different bit length.

Referring to FIG. 10, a schematic representation of how the address is built up is shown. Each of the RAM paging registers is concatenated with its corresponding sixteen bit register. For example, the eight bits of the RAM paging register RAMPX are concatenated with the sixteen bits of the X register, to form a twenty-four bit address. In the preferred embodiment, the eight bits of RAMPX serve as the high order bits X[23 . . . 16] of the twenty-four bit logical address, while the sixteen bits of the X register provide the low order bits X[15 . . . 0] of the twenty-four bit logical address. The memory model created by this arrangement is a set of 64K byte (64*1024) pages, each 64K page being accessed by an eight bit RAM paging register for a total of 256 pages.

Figure 12:
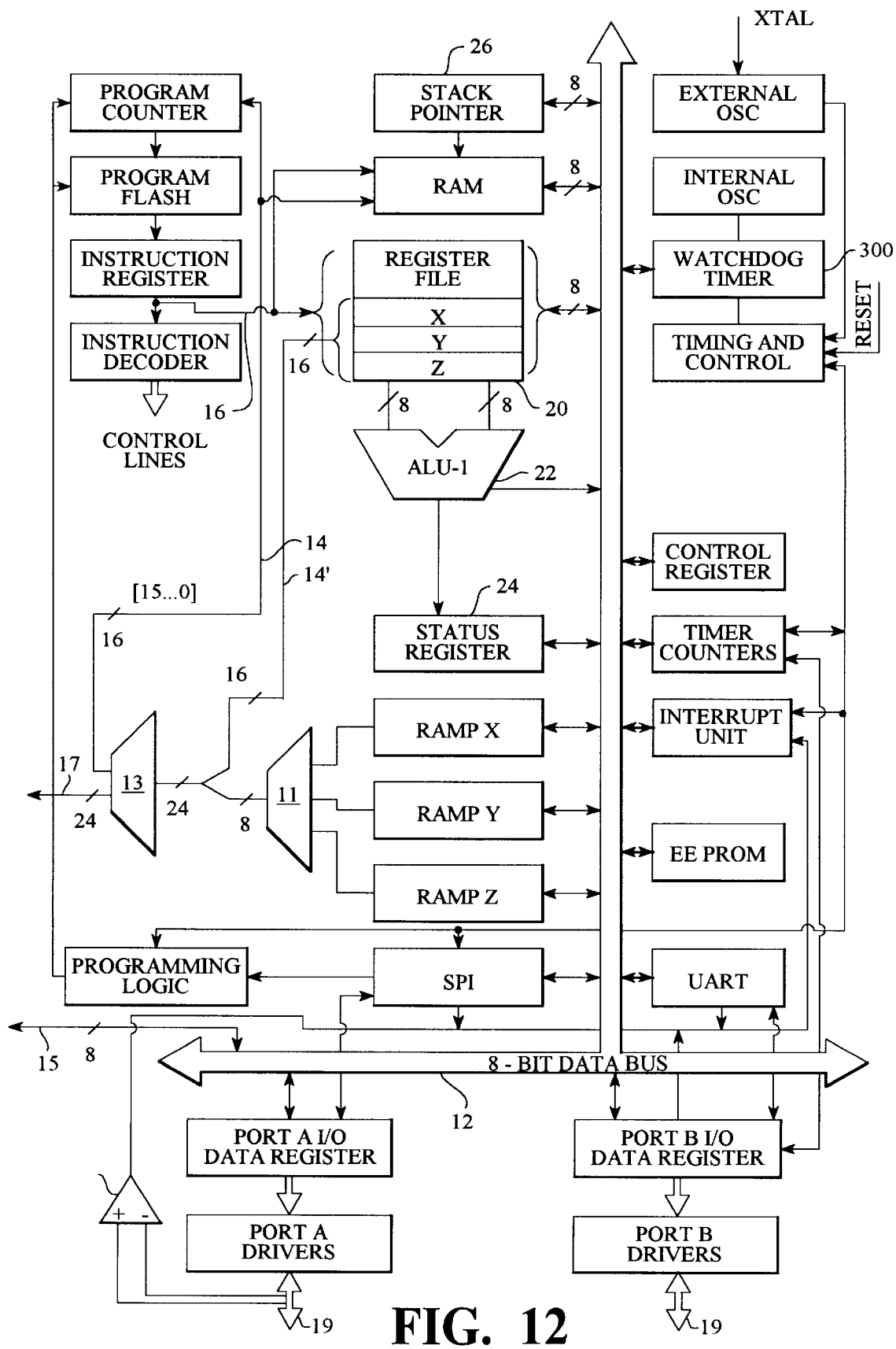
FIG. 12 is a diagram of the microcontroller of FIG. 1, incorporating the paging registers shown in FIG. 10.

Turn now to FIG. 12 for a description of an embodiment of the RAM paging registers in the context of the disclosed embodiments of the invention. Each of the RAM paging registers RAMPX,RAMPY,RAMPZ is coupled to the eight bit data bus 12, to receive an eight bit page reference during program execution. A selector 11 (for example, a 3:1 multiplexer) receives the eight bits from each of the RAM paging registers and transfers the eight bits of a selected one of the RAM paging registers to the output of the selector. The sixteen bits of the bus interface 14' of the REGISTER FILE 20 are concatenated with the eight bits from the selector 11 to form a twenty-four bit address which is carried by the indirect-address bus 14.

The extended twenty-four bit addressing of the invention allows for the use of externally provided RAM (not shown), since a twenty-four bit address is capable of addressing 16M (16*1024*1024) of RAM. An external twenty-four bit address bus 17 and an eight bit data bus 15 are included for data access between the microcontroller and external RAM (not shown). In accordance with the present invention, the REGISTER FILE 20, the I/O data registers (I/O space), the on-board RAM, and the external RAM occupy the same data address space. The REGISTER FILE occupies the first 32 address locations, followed by addresses allocated to the I/O space, and the on-board RAM which occupies N address locations, N being the size of the RAM. The remainder of the address space is provided by external RAM. Thus, the address range 00 to (N−1) maps to memory locations of the on-board memory (REGISTER FILE, I/O space, and RAM), while the remaining address range N to (16M−1) maps to memory locations in the external RAM. For example, if the on-board memory has a total of 64K bytes, then the on-board address range is $00 to $FFFF ("$" signifies hexadecimal notation), while the address range of the external RAM is $10000 to $FFFFFF. It is noted that the amount of on-board memory can be varied without affecting the utility or operability of the present invention, the actual amount memory depending upon design criteria such as available silicon area, device geometries, and design rules.

In order to ensure that the on-board memory and the external RAM are correctly accessed for a given address, a second selector 13 is used to transfer the address either to the internal address bus 14 or to the external address bus 17. In a preferred embodiment, the selector 13 is a 1:2 mux wherein the single MUX input is transferred to one of its two outputs. Here, the single input is the twenty-four bit address line coming out of the selector 11. One of the outputs of the selector 13 is coupled to the address bus 14, while the other output is coupled to the external address bus 17. Upon detecting an address within the address range of the on-board memory, the selector 13 is caused to transfer its input to the address bus 14. Observe that only the low order 16 bits [15 . . . 0] of the twenty-four bit address are transferred to the address bus 14. Conversely, selector 13 will transfer its input to the external address bus 17 upon detection of an address within the address range of the external memory. Any of a number of detection schemes is possible, all being within the ability of a designer of ordinary skill. For example, one may OR together the high order eight bits (bits [23 . . . 0]) of the twenty-four bit address, using the result to control the selector 13. If the OR operation results in FALSE, meaning that the address falls within the address range of the on-board memory, then the selector 13 should transfer its input to the internal address bus 14. If the OR operation results in TRUE, meaning that the address is a full twenty-four bit address, then the selector 13 should transfer its input to the external address bus 17.

Having described the hardware details pertinent to the features of the eight bit microcontroller of the present invention, the discussion will now turn to the instruction set of the microcontroller.

Table I summarizes the control lines which control the microcontroller to implement the instruction set:

TABLE I

| | Control Lines |
|---|---|
| ADDR_SEL | selects a 16-bit address, either from the register file or from ALU-2 |
| ALU1_OP | selects an operation to be performed n ALU-1 (see Table III) |
| ALU2_OP | selects an operation to be performed in ALU-2 |
| BIT_SEL | selects a bit (0 to 7) for receiving a bit |
| BR_SKP | enables the program counter to perform a branch or a skip |
| CPSE | asserts BR_SKP control if A and B are equal |
| D_SEL | selects a source of data to be loaded into a register |
| F_CLR | clear a specified status flag |
| F_OUT | outputs a status flag |
| F_SET | set a specified status flag |
| F_SETALU | set status flags in response to performing an operation in ALU-1 |
| F_SEL | select a status flag to be set or cleared |
| R_OUTA | select a register to output data at A of the register file 100 |
| R_OUTB | select a register to output data at B of the register file 100 |
| R_OUTC | select a register to output data at C of the register file 100 |
| R_SEL | select a register to receive data |
| T_SEL | store a bit into T-flag |
| T_OUT | load T-flag in bit n of data bus (for BLD instruction) |
| TST_CLR | test whether a selected status flag is cleared |
| TST_SET | test whether a selected status flag is set |
| V_SEL | select a value for input to ALU-2 |
| WD_E | watchdog timer enable |
| WD_RST | watchdog timer delay reset |
| WD_SEL | watchdog timer delay select |
| WE_BIT | write-enable for a selected bit |
| WE_R | write-enable for a selected register |
| WE_XH | write-enable for the X register |
| WE_XL | write-enable for the X register |
| WE_YH | write-enable for the Y register |
| WE_YL | write-enable for the Y register |
| WE_ZH | write-enable for the Z register |
| WE_ZL | write-enable for the Z register |

Table II summarizes the data lines:

TABLE II

| | Data Lines |
|---|---|
| D_BUS | data from the eight-bit data bus 12 |
| D_ALU2H | data from dedicated ALU-2 (high byte) |
| D_ALU2L | data from dedicated ALU-2 (low byte) |
| K_IN | constant data value obtained from the instruction operand |

Table III summarizes the arithmetic and logic operations, the specific operation being selected by the control line ALU1_OP. Some instructions operate on two registers A and B. Other instructions operate on a register and a constant value k (i.e. "immediate" data).

TABLE III

| ALU-1 Operations (ALU1_OP: n) | | |
|---|---|---|
| n | operation | description |
| 1 | O ← A + B | ADD, add without carry |
| 2 | O ← A + B + Cy | ADC, add with carry |
| 3 | O ← A − B | SUB, subtract without carry |

TABLE III-continued

ALU-1 Operations (ALU1_OP: n)

| n  | operation | description |
|----|-----------|-------------|
| 4  | $O \leftarrow A - k$ | SUBI, subtract immediate |
| 5  | $O \leftarrow A - B - Cy$ | SBC, subtract with carry |
| 6  | $O \leftarrow A - B - Cy$ | SBCI, subtract immediate with carry |
| 7  | $O \leftarrow A \& B$ | AND, logical AND |
| 8  | $O \leftarrow A \& k$ | ANDI, logical AND with immediate |
| 9  | $O \leftarrow A \vee B$ | OR, logical OR |
| 10 | $O \leftarrow A \vee k$ | ORI, logical OR with immediate |
| 11 | $O \leftarrow A \text{ XOR } B$ | EOR, exclusive OR |
| 12 | $O \leftarrow \$FF - A$ | COM, one's complement |
| 13 | $O \leftarrow \$00 - A$ | NEG, two's complement |
| 14 | $O \leftarrow A \vee k$ | SBR, set bits in register |
| 15 | $O \leftarrow A \& (\$FF - k)$ | CBR, clear bits in register |
| 16 | $O \leftarrow A + 1$ | INC, increment |
| 17 | $O \leftarrow A - 1$ | DEC, decrement |
| 18 | $O \leftarrow A \& A$ | TST, test for zero or minus |
| 19 | $O \leftarrow A \text{ XOR } A$ | CLR, clear register |
| 20 | $O \leftarrow \$FF$ | SER, set register |
| 21 | $R1,RO \leftarrow A \times B$ | MUL, multiply (unsigned) |
| 22 | $O_{n+1} \leftarrow A_n$ $O_0 \leftarrow 0$ $Cy \leftarrow A_7$ | LSL, logical shift left |
| 23 | $O_n \leftarrow A_{n+1}$ $O_7 \leftarrow 0$ $Cy \leftarrow A_0$ | LSR, logical shift right |
| 24 | $O_0 \leftarrow Cy$ $O_{n+1} \leftarrow A_n$ $Cy \leftarrow A_7$ | ROL, rotate left through carry |
| 25 | $O_7 \leftarrow Cy$ $O_n \leftarrow A_{n+1}$ $Cy \leftarrow A_0$ | ROR, rotate right through carry |
| 26 | $O_n \leftarrow A_{n+1}$ for $n = 0 \ldots 6$ | ASR, arithmetic shift right |
| 27 | $O \leftarrow A$ where $O_{0\ldots3} \leftarrow A_{4\ldots7}$ and $O_{4\ldots7} \leftarrow A_{0\ldots3}$ | SWAP, swap nibbles |
| 28 | $A - B$ | CP, compare - sets flags only |
| 29 | $A - B - Cy$ | CPC, compare with carry - sets flags only |
| 29 | $A - k$ | CPI, compare with immediate - sets flags only |
| 30 | no operation | |

Table IV summarizes the arithmetic operations of dedicated ALU-2:

TABLE IV

ALU-2 Operations (ALU2_OP)

| n | operation |
|---|-----------|
| 1 | add ALU-2 inputs |
| 2 | subtract ALU-2 inputs |
| 3 | no operation |

Most instructions in the present invention are performed within a single clock cycle. The contents of each register are always available at the outputs of their corresponding flip-flops (FIG. 3). Thus, the contents of a selected register is almost immediately available at the output of mux's 120, 122, 124, requiring only a delay equal to the propagation delay of the combinatorial circuitry comprising the mux's. This period of time is generally referred to as the "combinatorial delay."

The following arithmetic and logic instructions are executed within one clock cycle: ADD, ADC, SUB, SUBI, SBC, SBCI, AND, ANDI, OR, ORI, EOR, COM, NEG, SBR, CBR, INC, DEC, TST, CLR, SER, LSL, LSR. ROL, ROR, ASR, SWAP, CP, CPC, CPI. As can be seen in FIG. 2, the A and B inputs become available to the general purpose ALU 22 almost immediately after the instruction is fetched and decoded. The R_OUTA control line selects and outputs the contents of the register to one of the two inputs to the ALU 22. R_OUTB is similarly asserted, if the instruction specifies a second register operand. Alternatively, the K_IN control lines serves as binary input to the ALU for those instructions which use immediate data. Meanwhile, the subunits OPn of the ALU (FIG. 7) perform their respective operations, and as soon as the inputs to the ALU are set up, a result becomes available after another small combinatorial delay. The result 22C of the subunit corresponding to the instruction is selected via the ALU1_OP control line and placed on the data bus 12. At the same time, the D_SEL control line (FIG. 3) operates the mux's 130, 132 to select the data bus input D_BUS. The R_SEL (and WE_R) control line selects the register into which the result is to be stored; and a "combinatorial delay" later, the result is clocked into the register. Also at the same time, the status flags set by the ALU are clocked into the status register (FIG. 6), by asserting F_SETALU.

A multiply instruction MUL performs a multiplication of two eight-bit registers, storing the sixteen-bit result into the R0/R1 register pair. Unlike the other ALU instructions, the MUL instruction requires two clock cycles: one cycle each for storing one-half of the sixteen-bit product into a register of the register pair.

A M0V instruction provides data transfer between registers in one clock cycle. The M0V instruction specifies a source register and a destination register. Referring the FIGS. 2, 3 and 4, the R_OUTC control line operates the mux 124 to drive the contents of the specified source register onto the data bus 12. At the same time, the D_SEL control line operates the mux's 130,132 to output the D_BUS to appear at the inputs D of the registers; and the R_SEL and WE_R control lines operate the selector control circuit 134 to clock the destination register, thus storing the contents provided by the D_BUS.

An LDI instruction allows specified data to be loaded into a register. The data is specified in the machine op-code of the LDI instruction, and appears as the K_IN input of the mux 130. The D_SEL control line operates mux's 130,132 to output K_IN, while the R_SEL and WE_R control lines operate the selector control circuit 134 to clock the specified register.

Operations on the sixteen-bit X, Y, Z registers include the LD instruction for transferring data to a specified register from a memory location addressed by an X, Y, Z register; and the ST instruction for transferring data from a specified register to a memory location addressed by an X, Y, Z register. The LD and ST instructions require two clock cycles to execute. Referring to FIGS. 2 and 3, during the first clock cycle, the R_OUTA and R_OUTB control lines select the register pair of the desired sixteen-bit register (X:R27/R26, Y:R29/R28, Z:R/31/R30). The ADDR_SEL control line operates selector 114 to place the B:A outputs onto the indirect address bus 14. Additionally, in the case of an ST instruction, the R_OUTC control line selects the register from which the data is to be read, placing the data on the bus 12. During the second clock cycle, the memory is strobed either to load data from memory onto the bus 12 (LD) or to write data into memory (ST). Additionally, in the case of an LD instruction, the R_SEL an WE_R control lines are selected to write data from D_BUS into the specified the register.

The LD and ST instructions each have two variants which are well suited for supporting certain C-language features, namely post-increment (LD+, ST+) and pre-decrement (LD−, ST−) operations. As noted above, the dedicated ALU-2 shown in FIG. 2 provides the sixteen bit arithmetic required of such operations.

Post-increment: In the first clock cycle, in addition to the above-described activity for the LD and ST instructions, the V_SEL control line selects the +1 input and ALU2_OP operates the dedicated ALU-2 to perform an addition operation, after the sixteen bit address is placed on the bus 14. The result of the addition 102 is coupled to the D_ALU2H and D_ALU2L inputs of the register circuitry 100. The D_SEL control line in FIG. 3 selects the D_ALU2H and D_ALU2L mux inputs, sending D_ALU2H to R27, R29 and R31, and D_ALU2L to R26, R28 and R30. The appropriate WE_[XYZ]L and WE_[XYZ]H control lines are then asserted to write the data into the correct register pair.

Pre-decrement: In the first clock cycle, in addition to the above-described activity for the LD and ST instructions, V_SEL selects the −1 input and ALU2_OP causes ALU-2 to perform an addition. The result (i) is fed back into the register circuitry as described above and (ii) is selected by ADDR_SEL to serve as a pre-decrement address.

The LD and ST instructions each have a third variant (LDD, STD) for the purpose of simplifying table lookup operations. The LDD and STD instructions specify a displacement value which is added to the sixteen bit address register prior to the memory access. In the first clock cycle, in addition to the above-described activity for the LD and ST instructions, V_SEL selects the K_IN input and ALU2_OP causes ALU-2 to perform an addition. The result is selected by ADDR_SEL which serves as a displacement address.

In addition to providing computations for the LD and ST instructions, the dedicated ALU-2 is used to facilitate sixteen-bit add and subtract instructions, namely the ADIW and SBIW instructions. The dedicated ALU-2 makes possible computations with the X, Y, Z registers in one clock cycle, which is not otherwise possible using the general purpose ALU 22. The ADIW and SBIW instructions specify one of the X, Y, Z registers and a constant value to be added thereto. In operation, the R_OUTA and R_OUTB control lines select the specified register pair as a first input to the dedicated ALU-2. V_OUT selects K_IN (the constant value) as the second input to ALU-2. ALU2_OP selects either the addition or subtraction operation. The result 102 is fed back into the D_ALU2H and D_ALU2L inputs of the register circuitry 100. The D_SEL control line shown in FIG. 3 selects the D_ALU2H and D_ALU2L mux inputs, sending D_ALU2H to R27, R29 and R31, and D_ALU2L to R26, R28 and R30. The appropriate WE_[XYZ]L and WE_[XYZ]H control lines are then asserted to write the data into the desired register pair.

The microcontroller provides instructions for setting and clearing the various flags of the status register 24, each of which executes in one clock cycle. They include: BSET and BCLR; and SEx and CLx, where x is I, T, H, S, V, N, Z, or C. At the assembly-language level, the SEx and CLx instructions require no additional operands, while the BSET and BCLR instructions include a status flag operand s, identifying the flag to be affected.

Referring to FIG. 6, the control signal F_SEL operates the decoders 204, 206 to select the flag to be affected. In the case of a clear flag instruction, the F_CLR control line serves as an enabling signal, providing output at the enabling AND gate 224 corresponding to the affected flag. The output is coupled to the reset R input of the flip-flop, thus clearing the flip-flop. In the case of a set flag instruction, the F_SET control line serves a dual purpose: First it serves an input to each of the flip-flops for the purpose of setting one of the status flags (selected by F_SEL). Second, the F_SET control line is an enabling signal for the enabling AND gate 226, the outputs of which are coupled to the flip-flop clock lines for the purpose of clocking in the input.

As mentioned above, a feature of the present invention microcontroller is the bit access capability, which is provided by the one-clock cycle BST and BLD instructions. The BST instruction specifies a register and a bit position in the register to be copied into the T flag of the status register. The R_OUTC control line selects the register whose contents are driven onto the data bus 12 by the mux 124. At the same time, the BIT_SEL control line operates mux 210 (FIG. 6) to select the desired bit from the data bus, which is then loaded into the T flip-flop by asserting the T_SEL control line.

The BLD instruction loads the bit stored in the T flag into the specified bit position of the specified register. The F_OUT control line operates the mux 202 to select the T flag, while the T_OUT control line drives the output onto bit n of the data bus. At the same time, turning to FIG. 3, the D_SEL control line selects the third input of mux's 130, 132, thus presenting D_BUS$_N$ as input to all of the registers. The R_SEL, BIT_SEL and WE_BIT control lines (FIGS. 4, 5A and 5B) clock flip-flop of the desired register/bit location.

The following conditional branch instructions are provided, each specifying a displacement amount:
BRBS[C]—branch if a specified status flag is set [cleared]
BREQ[NE]—branch if the Z flag is set[cleared]
BRCS[CC]—branch if the C flag is set[cleared]
BRLO[SH]—branch if the C flag is set[cleared]
BRMI[PL]—branch if the N flag is set[cleared]
BRLT[GE]—branch if the S flag is set[cleared]
BRHS[HC]—branch if the H flag is set[cleared]
BRTS[TC]—branch if the T flag is set[cleared]
BRVS[VC]—branch if the V flag is set[cleared]
BRIE[ID]—branch if the I flag is set[cleared]

In addition to the above branch instructions, the SBRC and SBRS instructions are provided for skipping over the next instruction based upon the outcome of testing a specified bit of a specified register. Similarly, the CPSE instruction compares the contents of two registers and skips over the next instruction based upon the outcome of the comparison, namely skip if equal. These instructions execute in one or two clock cycles, depending on whether a branch is taken.

Referring to FIGS. 6 and 9, upon fetching a BRxx instruction the F_OUT control line carries control signals to output the desired status flag from mux 202, and either FTST_SET or FTST_CLR is asserted so that the bit test means 208 performs the proper bit test. Meanwhile the program counter 28 has been incremented and the next instruction pre-fetched. If the bit test fails, then the pre-fetched instruction is taken as the next instruction to be executed. If the bit test passes, the BR_SKP control line is asserted, causing the program counter to form the branch address and the instruction register 25 to be loaded with the new instruction. Loading of a new instruction requires a second clock cycle.

Referring to FIG. 3, generation of the BR_SKP control signal with reference to the SBRC and the SBRS instructions is shown. The desired register is selected by the mux 120 via the R_OUTA control line and coupled to the input of mux 136. The BIT_SEL control line operates the mux 136 to output the desired bit, which is then tested in the bit test means 138 by the assertion of either the BTST_CLR or the BTST_SET control line. The BR_SKP control line is asserted depending on the outcome of the test.

Referring to FIGS. 3 and 7, generation of the BR_SKP control signal with respect to the CPSE instruction will be explained. The contents of the two registers of interest are made available at the A and B inputs of the general purpose ALU 22 by operation of the mux's 120, 122 via the R_OUTA and R_OUTB control lines. The "comparison" operation is performed in the ALU via the XOR gate 23 and the AND gate 24. The control line CPSE is asserted to enable the output of the AND gate, so that BR_SKP is asserted when A=B.

The following unconditional branch instructions are provided: the RJMP instruction specifies a displacement value which is added to the program counter to produce a relative jump address; the IJMP instruction utilizes the contents of the Z register as the jump address; and the JMP instruction specifies a jump address which is loaded into the program counter. The IJMP instruction generates control signals for the R_OUTA and R_OUTB control lines to select the register pair R31/R30 which comprises the Z-register. As can be seen in FIG. 2, the mux 114 is operated by ADDR_SEL to drive the contents of the Z register onto the indirect address bus 14, which is then loaded into the program counter 28.

The following subroutine-related instructions are provided: the CALL instruction specifies an address which is the beginning address of a subroutine; the RCALL instruction specifies a displacement value which is added to the program counter to produce the beginning address of the subroutine; and the ICALL instruction utilizes the contents of the Z register as the beginning address of the subroutine. During execution of the ICALL instruction, the register file 20 is operated in the same manner as described above for the IJMP instruction. The subroutine call instructions also operate the stack pointer and the stack, namely the area in the RAM addressed by the stack pointer, to save the return address.

The subroutine return instructions include the standard RET instruction simply loads the program counter with the contents of the top of the stack and updates the stack pointer accordingly. In addition, a RETI instruction is provided for a return from an interrupt handler. The RETI instruction operates in the same manner as RET, with the additional action of setting the I flag in the status register.

The PUSH and POP instructions operate the stack pointer by asserting the SP_INC and SP_DEC control lines accordingly and writing to or reading from the stack (in RAM).

The IN and OUT instructions are used to transfer data via the data bus 12 between a register and an I/O port data register, which like the registers of the register file consists of a series of flip-flops. The IN instruction loads data from an I/O port into a register. The contents of the data register of the specified port are driven onto the data bus 12. The D_SEL control line operates the mux's 130,132 to output D_BUS. The R_SEL and WE_R control lines operate the selector control circuit 134 so that the desired register clocks in the data. Conversely, the OUT instruction loads data from a register to an I/O port. Data is loaded from the specified register onto the data bus by asserting R_OUTC. The flip-flops of the data register of the selected port are then operated to clock in the data appearing on the data bus 12.

The LPM instruction loads a byte of data from program memory into register R0. The address in the program memory is contained in the Z register. The Z register is accessed by asserting R_OUTA and R_OUTB to output registers R31/R30 at the mux's 120, 122, and driving the resulting sixteen-bit value (FIG. 2) onto the address bus 14 via the mux 114. The program memory is accessed and the data is loaded onto the data bus. The D_SEL control line (FIG. 3) selects the D_BUS input, while the R_SEL and WE_R control lines operate the selector control circuitry to clock the flip-flops corresponding to register R0, thus loading D_BUS into register R0.

The SLEEP instruction sets the microcontroller in sleep mode. Upon waking up by an interrupt, the program counter and instruction register are operated to load and execute the instruction following the SLEEP instruction prior to executing the interrupt handler.

Figure 11:
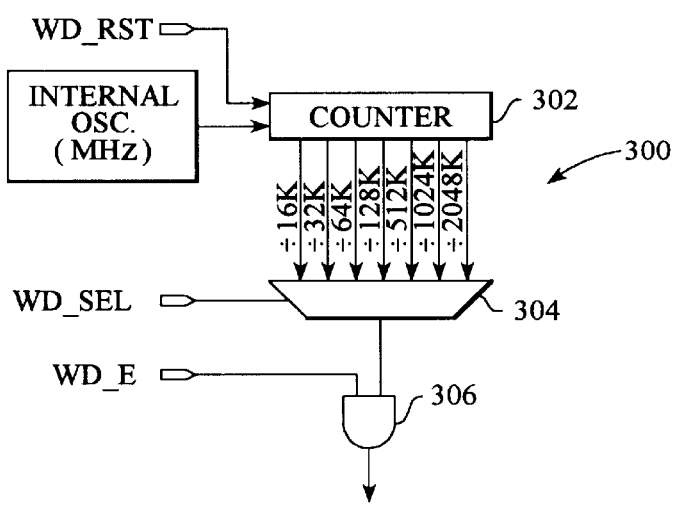
FIG. 11 depicts the watchdog timer circuitry.

The microcontroller includes a watchdog timer 300 (FIG. 1) which will cause a reset of the microcontroller unless the timer is reset within a certain user selectable time period. FIG. 11 shows that the timer 300 consists of a counter 302 having a plurality of outputs coupled to a selector 304. The counter is clocked by the internal oscillator which runs at 1 MHz. Each output of the counter is asserted after a certain number of counts. The counter 302, therefore, operates as a delay means having a plurality of delay times. As shown in FIG. 11, the counter outputs can provide delay times from 16 mS to 2048 mS in 16 mS increments. The delay time is selected by the control lines WD_SEL via the selector 304, whose output is coupled to an enabling AND gate 306 which is enabled by the WD_E control line. When a period of time equal to the selected delay time has passed the corresponding counter output goes high, thus asserting the MCU RESET line. The WD_SEL and WD_E control lines are the outputs of flip-flops which comprise the watchdog register 308. Data is read into the register 308 via the data bus 12.

The WDR instruction is used to reset the watchdog timer 300. The instruction decoder 23 generates a WD_RST signal which resets the counter 302. Thus, when the timer is enabled (WD_E is HIGH), a WDR instruction must be executed with a frequency that corresponds to the selected delay time; otherwise the microcontroller will be reset.

We claim:

1. A microcontroller comprising:

an instruction set;

a program memory for storing instructions selected from the instruction set;

an instruction execution unit having a plurality of control lines for providing control signals in response to execution of an instruction;

fetch means for obtaining an instruction from the program memory and loading the obtained instruction into the instruction execution unit;

a program bus coupling the fetch means to the instruction execution unit;

a data memory separate from the program memory, the data memory having an address space;

an eight-bit data bus separate from the program bus, the data bus being coupled to the data memory;

a register file coupled to the data bus, the register file having a plurality of eight-bit registers, the register file further having combining means for accessing two of the eight-bit registers as a single logical sixteen-bit register, the register file further having a dedicated ALU coupled to the combining means to perform arithmetic functions on a logical sixteen-bit register accessed via the combining means;

a general purpose ALU having first and second inputs coupled to the register file to receive the contents of two eight-bit registers, the general purpose ALU having a third input to receive a constant-value datum, the general purpose ALU having means for selectively operating on the first, second, and third inputs to produce an output in one clock cycle, the general purpose ALU having an output coupled to the data bus;

a status register coupled to the data bus and to the general purpose ALU, the status register having flags including an interrupt enable flag, a bit transfer flag, a half-carry flag, a two's complement overflow flag, a negative flag, a sign bit, a zero flag and a carry bit, the status register further having a bit test means for accessing and testing one of the flags;

a direct-address bus coupling the instruction execution unit to directly access either the data memory or the register file during program execution; and an indirect-address bus to provide the register file with indirect data access to the data memory during program execution, the indirect-address bus having address-receiving means for receiving a sixteen-bit value from the combining means to serve as a sixteen-bit address;

the eight-bit registers of the register file having addresses defined within the address space of the data memory, thereby being accessible both as registers and as memory locations.

2. The microcontroller of claim 1 further including BST and BLD instructions each having a machine op-code which specifies a register and a bit identifier, the instruction execution unit effective for producing bit manipulation control signals in response to execution of the BST and BLD instructions, the bit manipulation control signals effective for (i) operating the register file to access the register and the bit position identified by the bit identifier, and (ii) transferring either the content of an accessed bit position to the bit transfer flag in the status register or the content of the bit transfer flag to the accessed bit position.

3. The microcontroller of claim 2 further including a first plurality of instructions each having a machine op-code which specifies a destination register and a source register-pair, the instruction execution unit effective for producing first control signals in response to execution of one of the first instructions, the first control signals effective for (i) operating the combining means of the register file to provide the contents of the source register-pair as an indirect address, (ii) operating the data memory to access the contents of a memory location specified by the indirect address, and (iii) operating the register file to store the contents of the memory location into the destination register, the first instructions including LD, LD+, LD−, and LDD.

4. The microcontroller of claim 3 further including a second plurality of instructions each having a machine op-code which specifies a destination register-pair and a source register, the instruction execution unit effective for producing second control signals in response to execution of one of the second instructions, the second control signals effective for (i) operating the register file to access the contents of the source register, (ii) operating the combining means of the register file to provide the contents of the destination register-pair as an indirect address, (iii) operating the data memory to store the contents of the source register to a memory location specified by the indirect address, the second instructions including ST, ST+, ST−, and STD.

5. The microcontroller of claim 4 further including a third plurality of instructions each having a machine op-code which specifies a first register and a second register, the instruction execution unit effective for producing third control signals in response to execution of one of the third instructions, the third control signals effective for (i) operating the register file to provide the contents of the first and second registers as inputs to the general purpose ALU, (ii) operating the general purpose ALU to perform an ALU operation specified in the op-code, and (iii) operating the register file to store the output of the ALU operation into the first register, the third instructions including ADD, ADC, SUB, SBC, AND, OR, and EOR.

6. The microcontroller of claim 5 further including a fourth plurality of instructions each having a machine op-code which specifies a register and a constant value, the instruction execution unit effective for producing fourth control signals in response to execution of one of the fourth instructions, the fourth control signals effective for (i) operating the register file to provide the contents of the register as a first input to the general purpose ALU, (ii) providing the constant value as a fourth input to the general purpose ALU, (iii) operating the general purpose ALU to perform an ALU operation specified in the op-code, and (iv) operating the register file to store the output of the ALU operation into the register, the fourth instructions including SUBI, SBCI, ANDI, ORI, SBR, and CBR.

7. The microcontroller of claim 6 further including a fifth plurality of instructions each having a machine op-code which specifies a register, the instruction execution unit effective for producing fifth control signals in response to execution of one of the fifth instructions, the fifth control signals effective for (i) operating the register file to provide the contents of the register as an input to the general purpose ALU, (ii) operating the general purpose ALU to perform an ALU operation specified in the op-code, and (iii) operating the register file to store the output of the ALU operation into the register, the fifth instructions including COM, NEG, INC, DEC, TST, CLR, and SER.

8. The microcontroller of claim 7 further including a sixth plurality of instructions each having a machine op-code which specifies a status bit and a displacement value, the instruction execution unit effective for producing sixth control signals in response to execution of one of the sixth instructions, the sixth control signals effective for (i) operating the bit test means to test the status bit and (ii) based upon the outcome of the tested status bit, optionally operating the fetch means so that the next instruction to be loaded for execution is obtained from a location in the program memory that is displaced from the location of the current instruction by an amount equal to the displacement value, the sixth instructions including BREQ, BRNE, BRCS, BRCC, BRSH, BRLO, BRMI, BRPL, BRHS, BRHC, BRTS, BRTC, BRVS, BRVC, BRID, BRIE, BRBC, BRBS, BRGE, and BRLT.

9. The microcontroller of claim 8 further including a seventh plurality of instructions each having a machine op-code which specifies a register-pair and a constant value, the instruction execution unit effective for producing seventh control signals in response to execution of one of the seventh instructions, the seventh control signals effective for (i) operating the combining means of the register file to provide the contents of the register-pair as an input to the dedicated ALU, (ii) providing the constant value as another input to the dedicated ALU, (iii) operating the ALU to perform addition or subtraction, and (iv) operating the register file to store the result of the operation into the register-pair, the seventh instructions including ADIW and SBIW.

10. The microcontroller of claim 9 further including an eighth plurality of instructions each having a machine op-code which specifies a register and a bit identifier, the instruction execution unit effective for producing eighth control signals in response to execution of one of the eighth instructions, the eighth control signals effective for (i) operating the register file to access the register and to test a bit specified by the bit identifier and (ii) based upon the outcome of the tested bit, optionally operating the fetch means to skip the next instruction, the eighth instructions including SBRC and SBRS.

11. The microcontroller of claim 10 further including a CPI instruction having a machine op-code specifying a register and a constant value, the instruction execution unit effective for producing CPI control signals in response to execution of the CPI instruction, the CPI control signals effective for (i) operating the register file to provide the contents of the register as a first input to the dedicated ALU, (ii) providing the constant value as a second input to the dedicated ALU and (iii) operating the dedicated ALU to subtract the second input from the first input.

12. The microcontroller of claim 11 further including a CPC instruction having a machine op-code specifying first and second registers, the instruction execution unit effective for producing CPC control signals in response to execution of the CPC instruction, the CPC control signals effective for (i) operating the register file to provide the contents of the first and second registers as inputs to the dedicated ALU and (ii) operating the dedicated ALU to compute $R_f$–$R_s$–C, where
  $R_f$ is the first register,
  $R_s$ is the second register, and
  C is the carry bit.

13. The microcontroller of claim 12 further including a CP instruction having a machine op-code specifying first and second registers, the instruction execution unit effective for producing CP control signals in response to execution of the CP instruction, the CP control signals effective for (i) operating the register file to provide the contents of the first and second registers respectively as first and second inputs to the dedicated ALU and (ii) operating the dedicated ALU to subtract the second input from the first input.

14. The microcontroller of claim 13 further including a CPSE instruction having a machine op-code specifying first and second registers, the instruction execution unit effective for producing CPSE control signals in response to execution of the CPSE instruction, the CPSE control signals effective for (i) operating the register file to provide the contents of the registers identified by the first and second registers respectively as first and second inputs to the general purpose ALU, (ii) operating the general purpose ALU to compare the first and second inputs, and (iii) based upon the outcome of a comparison, optionally operating the fetch means to skip the next instruction.

15. The microcontroller of claim 14 further including a ninth plurality of instructions each having a machine op-code which specifies a displacement value, the instruction execution unit effective for producing ninth control signals in response to execution of one of the ninth instructions, the ninth control signals effective for operating the fetch means so that the next instruction to be loaded for execution is obtained from a location in the program memory that is displaced from the location of the current instruction by an amount equal to the displacement value, the ninth instructions including RJMP and JMP.

16. The microcontroller of claim 15 further including an IJMP instruction, the instruction execution unit effective for producing IJMP control signals in response to execution of the IJMP instruction, the IJMP control signals effective for (i) operating the combining means of the register file to provide the contents of two registers as a single displacement value and (ii) operating the fetch means so that the next instruction to be loaded for execution is obtained from a location in the program memory that is displaced from the location of the current instruction by an amount equal to the single displacement value.

17. The microcontroller of claim 16 further including a tenth plurality of instructions each having a machine op-code which specifies a displacement value, the instruction execution unit effective for producing tenth control signals in response to execution of one of the tenth instructions, the tenth control signals effective for (i) pushing the location in the program memory of the next instruction to be executed onto the stack and (ii) operating the fetch means so that the next instruction to be loaded for execution is obtained from a location in the program memory that is displaced from the location of the current instruction by an amount equal to the displacement value, the tenth instructions including RCALL and CALL.

18. The microcontroller of claim 17 further including an ICALL instruction, the instruction execution unit effective for producing ICALL control signals in response to execution of the ICALL instruction, the ICALL control signals effective for (i) operating the combining means of the register file to provide the contents of two registers as a single displacement value, (ii) pushing the location in the program memory of the next instruction to be executed onto the stack, and (iii) operating the fetch means so that the next instruction to be loaded for execution is obtained from a location in the program memory that is displaced from the location of the current instruction by an amount equal to the single displacement value.

19. The microcontroller of claim 18 further including an eleventh plurality of instructions each having a machine op-code which specifies a displacement value, the instruction execution unit effective for producing eleventh control signals in response to execution of one of the eleventh instructions, the eleventh control signals effective for (i) popping the stack to obtain a location in the program memory and (ii) operating the fetch means so that the next instruction to be loaded for execution based on the location in the program memory obtained from the stack, the eleventh instructions including RET and RETI.

20. The microcontroller of claim 19 wherein the instruction execution unit further produces, in response to execution of the RETI instruction, control signals which operate the status register to set the global interrupt flag.

21. The microcontroller of claim 20 further including a twelfth plurality of instructions each having a machine op-code which specifies a destination register and a data source, the instruction execution unit effective for producing twelfth control signals in response to execution of one of the twelfth instructions, the twelfth control signals effective for (i) operating the register file to access the contents of a register if the data source is a register and (ii) operating the register file to store into the destination register either accessed register contents if the data source is a register or the data source itself if the data source is a constant value, the twelfth instructions including M0V and LDI.

22. The microcontroller of claim 21 further including a PUSH instruction specifying a register, the instruction execution unit effective for producing PUSH control signals in response to execution of the PUSH instruction, the PUSH control signals effective for (i) updating the stack pointer to point to a next location in the stack and (ii) operating the stack to receive the contents of the register.

23. The microcontroller of claim 22 further including a POP instruction specifying a register, the instruction execution unit effective for producing POP control signals in response to execution of the POP instruction, the POP control signals effective for (i) operating the stack to store the contents thereof to the register and (ii) updating the stack pointer to point to a previous location in the stack.

24. The microcontroller of claim 23 further including IN and OUT instructions, each having a machine op-code specifying a port and a register, the instruction execution unit effective for producing port control signals in response to execution of one of the IN and OUT instructions, the port control signals effective for (i) operating the register file to access the register and (ii) either transferring the contents from the accessed register to the port or transferring the contents of the port to the accessed register.

25. The microcontroller of claim 24 further including an LPM instruction, the instruction execution unit effective for producing LPM control signals in response to execution of the LPM instruction, the LPM control signals effective for (i) operating the combining means of the register file to provide the contents of two registers as a program address, (ii) accessing data in a memory location of the program memory specified by the program address, and (iii) operating the register file to store the accessed data in a register.

26. The microcontroller of claim 25 further including a thirteenth plurality of instructions, the instruction execution unit effective for producing thirteenth control signals in response to execution of one of the thirteenth instructions, the thirteenth control signals effective for (i) operating the status register to access a bit therein and (ii) either setting or clearing the accessed bit, the thirteenth instructions including SEC, CLC, SEN, CLN, SEZ, CLZ, SEI, CLI, SES, CLS, SEV, CLV, SET, CLT, SEH, CLH, BSET, and BCLR.

27. The microcontroller of claim 26 further including an LSL instruction specifying a register, the instruction execution unit effective for producing first shift control signals in response to execution of the LSL instruction, the first shift control signals effective for (i) operating the register file to access the register, (ii) shifting the most significant bit of the accessed register into the carry bit, (iii) shifting the bits one position to the left, and (iv) clearing the least significant bit.

28. The microcontroller of claim 27 further including an LSR instruction specifying a register, the instruction execution unit effective for producing second shift control signals in response to execution of the LSR instruction, the second shift control signals effective for (i) operating the register file to access the register, (ii) shifting the least significant bit of the accessed register into the carry bit, (iii) shifting the bits one position to the right, and (iv) clearing the most significant bit.

29. The microcontroller of claim 28 further including an ROL instruction specifying a register, the instruction execution unit effective for producing third shift control signals in response to execution of the ROL instruction, the third shift control signals effective for (i) operating the register file to access the register, (ii) shifting the bits one position to the left, (iii) shifting the carry bit into the least significant bit, and (iv) shifting the most significant bit into the carry bit.

30. The microcontroller of claim 29 further including an ROR instruction specifying a register, the instruction execution unit effective for producing fourth shift control signals in response to execution of the ROR instruction, the fourth shift control signals effective for (i) operating the register file to access the register, (ii) shifting the bits one position to the right, (iii) shifting the carry bit into the most significant bit, and (iv) shifting the least significant bit into the carry bit.

31. The microcontroller of claim 30 further including an ASR instruction specifying a register, the instruction execution unit effective for producing fifth shift control signals in response to execution of the ASR instruction, the fifth shift control signals effective for (i) operating the register file to access the register, (ii) shifting the bits one position to the right, and (iii) shifting the least significant bit into the carry bit.

32. The microcontroller of claim 31 further including a SWAP instruction specifying a register, the instruction execution unit effective for producing swap control signals in response to execution of the SWAP instruction, the swap control signals effective for (i) operating the register file to access the register and (ii) swapping the high and low nibbles of the accessed register.

33. The microcontroller of claim 32 further including a SLEEP instruction, the instruction execution unit effective for producing sleep control signals in response to execution of the SLEEP instruction, the sleep control signals effective for placing the microcontroller in a sleep mode.

34. The microcontroller of claim 33 further including a watchdog timer having a watchdog reset line, an MCU reset line, and a delay means for asserting a signal on the MCU reset line after delaying for a period of time; the MCU reset line coupled to cause a reset of the microcontroller upon the assertion of a signal by the delay means; the watchdog reset line coupled to the delay means to initiate a delay period; the microcontroller further including a WDR instruction, the instruction execution unit, in response to execution of the WDR instruction, effective for asserting a signal on the watchdog reset line, thereby initiating a delay period.

35. The microcontroller of claim 4 wherein the instruction execution unit is further effective for producing, in response to execution of the LD+ and ST+ instructions, control signals which operate the dedicated ALU of the register file to increment the contents of the register-pair.

36. The microcontroller of claim 4 wherein the instruction execution unit is further effective for producing, in response to execution of the LD– and ST– instructions, control signals which operate the dedicated ALU of the register file to decrement the contents of the register-pair.

37. The microcontroller of claim 4 wherein the machine op-codes of the LDD and STD instructions further include a displacement value, the instruction execution unit further being effective for producing, in response to execution of the LDD and STD instructions, control signals which operate the dedicated ALU of the register file to add the displacement value to the indirect address provided by the combining means.

38. The microcontroller of claim 4 further including a multiply instruction having a machine op-code which specifies a multiplier register and a multiplicand register, the multiply instruction having associated high-byte and low-byte destination registers, the instruction execution unit effective for producing multiply control signals in response to execution of the multiply instruction, the multiply control signals effective for (i) operating the register file to provide the contents of the registers identified by the multiplier and multiplicand registers as inputs to the general purpose ALU, (ii) operating the general purpose ALU to perform the multiplication operation, and (iii) operating the register file to store the output of the multiplication operation into the registers identified by the high-byte and low-byte destination registers.

39. The microcontroller of claim 1 further including a paging register, and an address-forming means for forming an address from both the contents of said paging register and a sixteen-bit datum provided by said combining means.

40. The microcontroller of claim 39 wherein said paging register is an eight-bit register, said paging register being coupled to said eight-bit data bus, whereby loading a value into said paging register specifies one of 256 pages of 64K bytes each.

* * * * *